US012732397B1

(12) United States Patent
Van Dyck et al.

(10) Patent No.: US 12,732,397 B1
(45) Date of Patent: Sep. 8, 2026

(54) ADAPTIVE FRAME ALIGNMENT

(71) Applicant: Marvell Asia Pte Ltd, Singapore (SG)

(72) Inventors: Peter Van Dyck, Bruggen (DE); Seid Alireza Razavi Majomard, Belmont, CA (US); Ehab Tahir, Mississauga (CA)

(73) Assignee: Marvell Asia Pte Ltd, Singapore (SG)

( * ) Notice: Subject to any disclaimer, the term of this patent is extended or adjusted under 35 U.S.C. 154(b) by 336 days.

(21) Appl. No.: 18/486,953

(22) Filed: Oct. 13, 2023

Related U.S. Application Data

(60) Provisional application No. 63/533,120, filed on Aug. 16, 2023.

(51) Int. Cl.

| | |
|---|---|
| ***H04L 12/54*** | (2022.01) |
| ***H04L 1/20*** | (2006.01) |
| *H04L 12/70* | (2013.01) |

(52) U.S. Cl.

CPC ............ *H04L 12/5601* (2013.01); *H04L 1/20* (2013.01); *H04L 2012/5674* (2013.01); *H04L 2012/5681* (2013.01)

(58) Field of Classification Search

CPC ................... H04L 12/5601; H04L 1/20; H04L 2012/5674; H04L 2012/5681

See application file for complete search history.

(56) References Cited

U.S. PATENT DOCUMENTS

| | | | | |
|---|---|---|---|---|
| 7,457,267 | B1 * | 11/2008 | O'Neill | H04W 36/00692 370/332 |
| 8,335,969 | B2 * | 12/2012 | Gubbi | H03M 13/373 714/776 |
| 12,143,155 | B2 * | 11/2024 | Peng | H04L 1/0058 |
| 2013/0318417 | A1 * | 11/2013 | Danninger | H03M 13/29 714/755 |
| 2021/0152247 | A1 * | 5/2021 | Riani | H04B 10/27 |
| 2022/0200629 | A1 * | 6/2022 | Taylor | H03M 13/2792 |

* cited by examiner

*Primary Examiner* — Chandrahas B Patel

(74) *Attorney, Agent, or Firm* — Colby Nipper PLLC

(57) ABSTRACT

The present disclosure describes apparatuses and methods for adaptive frame alignment for a receiver. In some aspects, an adaptive frame aligner detects a failure by a decoder to decode a frame of symbols that are stored in a buffer. In response to the failure to decode, the adaptive frame aligner alters a pointer of the buffer to realign the symbols of a subsequent frame. The decoder can then attempt to decode the realigned symbols of the subsequent frame to provide decoded data of the subsequent frame. If the decoding attempt fails, the adaptive frame aligner can alter the pointer again to provide a different realignment of the symbols of another subsequent frame and may repeat this process until the decoder is able to decode the realigned symbols of a frame. By so doing, the adaptive frame aligner may enable the decoder to decoder the frame without retraining a data link.

20 Claims, 11 Drawing Sheets

Determine that a forward error correction (FEC) frame is not valid
802

Determine a signal quality metric of the FEC frame
804

Determine that the signal quality metric of the FEC frame meets a threshold
806

Adjust a pointer of a buffer to realign symbols of a subsequent FEC frame
808

Determine whether the subsequent FEC frame is valid
810

Decode realigned symbols of the subsequent FEC frame to provide decoded data
812

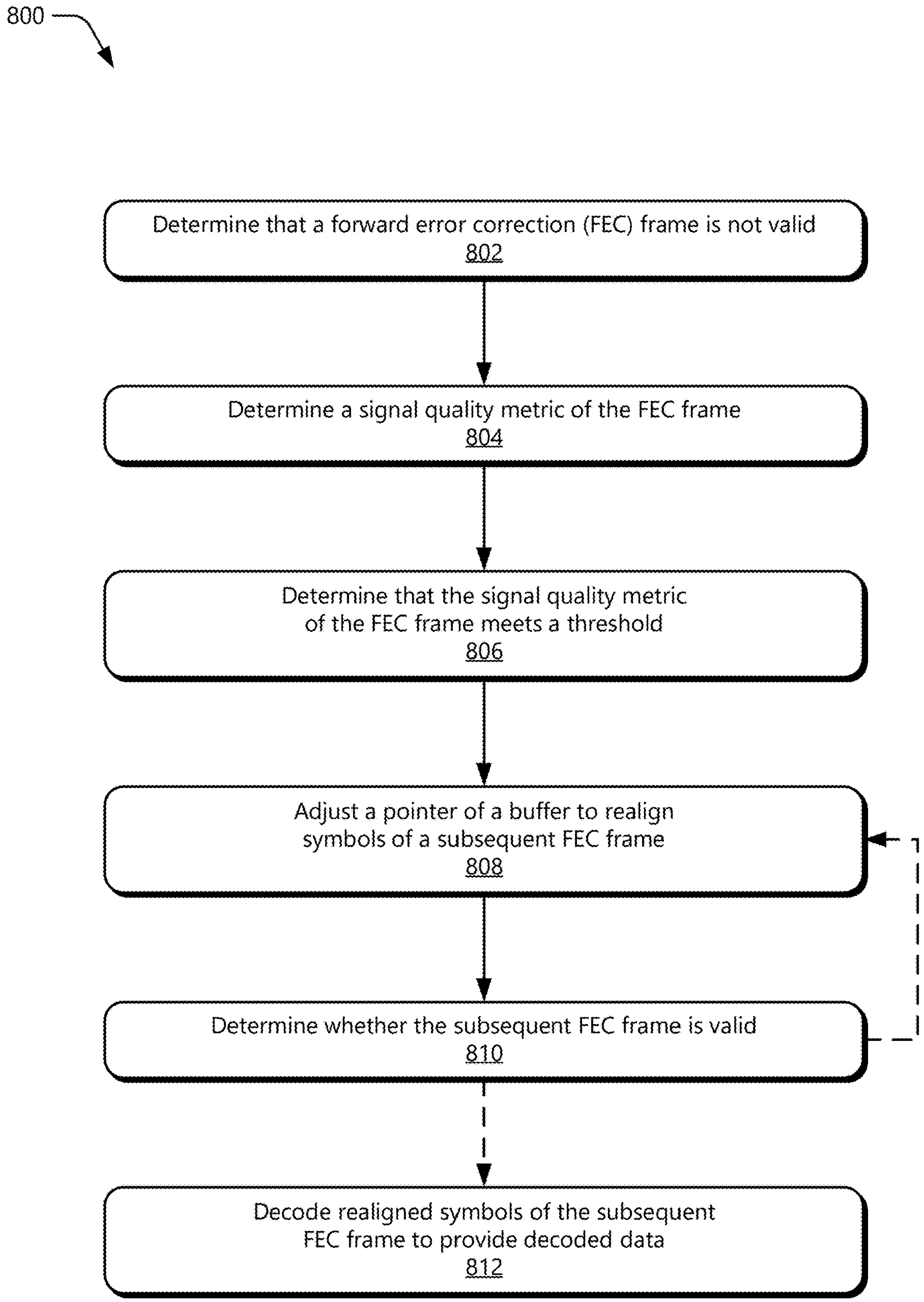

Fig. 8

ADAPTIVE FRAME ALIGNMENT

CROSS REFERENCE TO RELATED APPLICATION

This present disclosure claims priority to U.S. Provisional Patent Application Ser. No. 63/533,120 filed Aug. 16, 2023, the disclosure of which is incorporated by reference herein in its entirety.

BACKGROUND

Many computing and electronic devices transfer data to provide various functions of a device. Data transfer systems, such as data communication systems, are typically characterized as data channels. In data communication systems, for example, data can be transmitted using various channels such as printed circuit board (PCB) traces, wires, cables, fiber-optic cables, wireless mediums, and so forth. The efficiency and reliability of a data channel can depend on many factors, such as a signal-to-noise ratio (SNR) of the channel. Generally, a data channel having a high SNR generally enables more accurate reception and recovery of data. On the other hand, a data channel having a low SNR can result in high rates of data errors, which may include misread data, unrecoverable data, or failure of a data link.

In some cases, electromagnetic interference (EMI) or transient events, such as electrostatic discharge (ESD) or lightning-related electrical surges, can degrade the SNR of the data channel to the point that a data link between a transmitter and a receiver is dropped. While the data link is down, subsequent data communication is delayed until the transmitter and receiver can reestablish the data link. In many cases, particularly in low latency or time-sensitive systems, the loss of the data link may result in unacceptable latency or communication delays.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method for adaptive frame alignment implemented by a receiver includes storing symbols received via a physical layer (PHY) in a buffer and forming a frame from first symbols stored in the buffer. The method detects a failure to decode the first symbols of the frame and alters a pointer of the buffer to realign symbols of a subsequent frame formed from second symbols stored in the buffer. In some aspects, a signal quality metric is determined for the frame and the method alters the pointer of the buffer in response to the signal quality metric meeting a signal quality threshold for decoding the frame. The realigned symbols of the subsequent frame are then decoded to provide data decoded from the realigned symbols of the subsequent frame. By so doing, the adaptive frame aligner may enable the decoder to continue decoding frames of the realigned symbols without retraining a data link, avoiding data loss or data link interruptions.

In other aspects, an apparatus includes a network port, a PHY coupled to the network port, a decoder, and a buffer configured to store symbols received via the PHY. The apparatus also includes an adaptive frame aligner configured to store the symbols received via the PHY to the buffer and form a frame from first symbols stored in the buffer. The adaptive frame aligner or a frame synchronization block sends the frame of the first symbols to the decoder for decoding and can receive, from the decoder, an indication of a failure to decode the first symbols of the frame. The adaptive frame aligner is configured to alter, in response to the failure to decode the frame, a pointer of the buffer to realign symbols of a subsequent frame formed from second symbols stored in the buffer and send the realigned symbols of the subsequent frame to the decoder for decoding to provide decoded data that corresponds to the subsequent frame of the realigned symbols.

In yet other aspects, a system-on-chip (SoC) includes circuitry configured to implement a wired communication interface, PHY coupled to the circuitry, a decoder, and a buffer configured to store symbols received via the PHY. The SoC includes an adaptive frame aligner configured to store the symbols received via the PHY to the buffer and form a frame from first symbols stored in the buffer. The adaptive frame aligner or frame synchronization block then sends the frame of the first symbols to the decoder for decoding and can receive, from the decoder, an indication of a failure to decode the first symbols of the frame. The adaptive frame aligner alters, in response to the failure to decode the frame, a pointer of the buffer to realign symbols of a subsequent frame formed from second symbols of the buffer and sends the realigned symbols of the subsequent frame to the decoder for decoding to provide decoded data that corresponds to the frame of realigned symbols.

The details of one or more implementations of adaptive frame alignment are set forth in the accompanying drawings and the following description. Other features and advantages will be apparent from the description and drawings and from the claims.

BRIEF DESCRIPTION OF THE DRAWINGS

The details of one or more implementations of adaptive frame alignment are set forth in the accompanying figures and the detailed description below. In the figures, the left-most digit of a reference number identifies the figure in which the reference number first appears. The use of the same reference numbers in different instances in the description and the figures indicates like elements:

FIG. 8 depicts an example method for realigning a forward error correction frame in accordance with one or more aspects;

DETAILED DESCRIPTION

Figure 1:
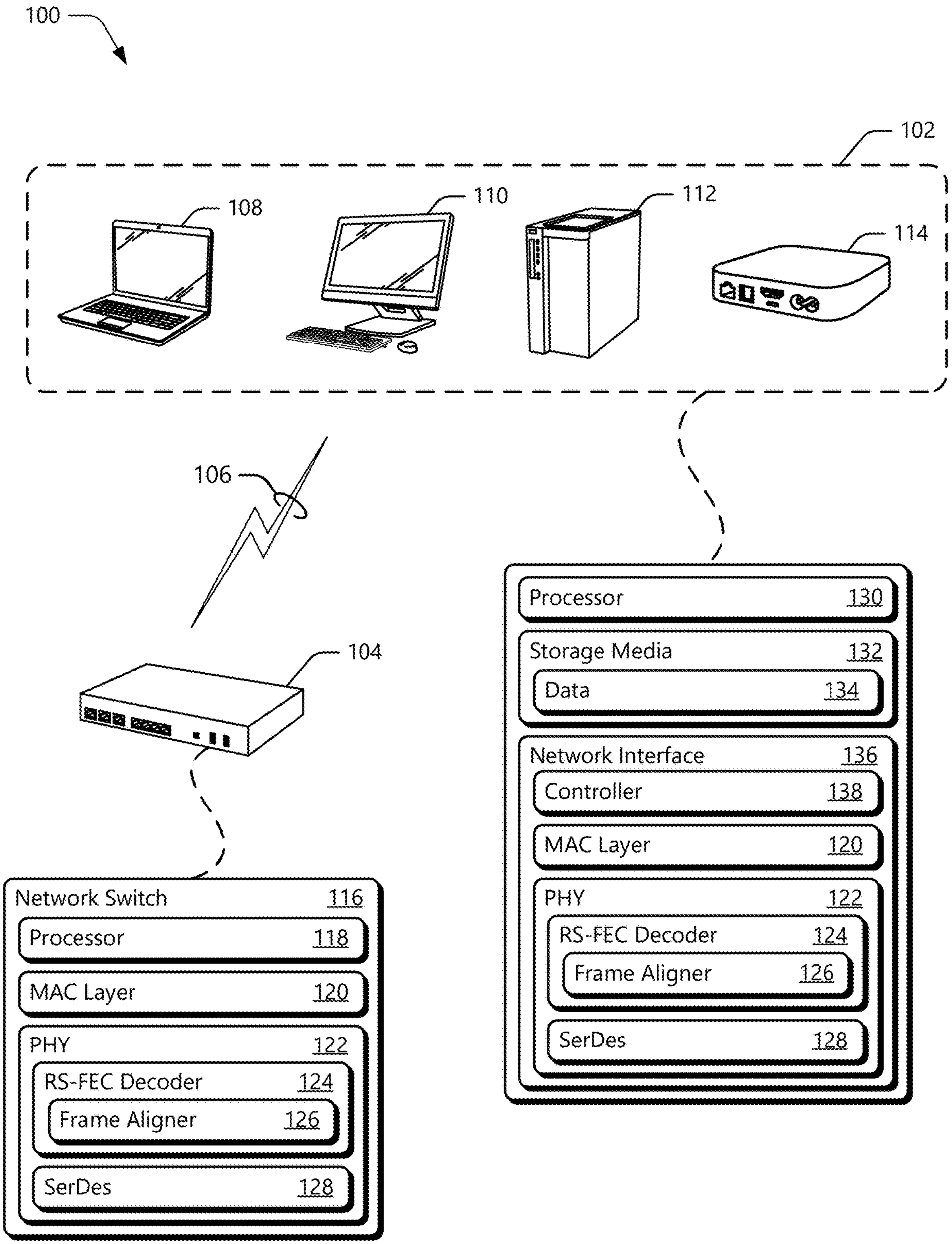
FIG. 1 illustrates an example operating environment having devices and a switch that can implement aspects of adaptive frame alignment in accordance with one or more aspects.

Many computing and electronic devices transfer data to provide various functions of a device. Data transfer systems, such as data communication systems, are typically characterized as data channels between a transmitter and a receiver. The efficiency and reliability of a data channel can depend on many factors, such as a signal-to-noise ratio (SNR) of the channel. Generally, a data channel having a high SNR generally enables more accurate reception and recovery of data. On the other hand, a data channel having a low SNR can result in high rates of data errors, which may include misread data, unrecoverable data, or failure of a data link. Additionally, electromagnetic interference (EMI) or transient events, such as electrostatic discharge (ESD) or lightning-related electrical surges, can degrade the SNR and disrupt clock synchronization of the data channel to the point that a data link between a transmitter and a receiver is dropped. As such, communications systems in high noise environments (e.g., automotive, industrial, medical, data centers) are often susceptible to EMI, ESD, or electrical transients that cause clock issues or link drops between transmitters and receivers.

For example, in IEEE 802.3ch or IEEE 802.3cy Multi-Gigabit Base-T1 systems, a Reed-Solomon decoder of the receiver is typically sensitive to time alignment of line-side coding frames. In some cases, high noise (e.g., EMI), ESD, or lightning-related events can cause loss of time alignment of a coding frame, which can cause the data link to drop and may also result in failure during some types of industry-related compliance testing (e.g., automotive environment ESD testing for industry compliance). While the data link is down, subsequent data communication is delayed until the transmitter and receiver can reestablish the data link through link retraining, which can consume a considerable amount of time in the context of high-speed data communication. In low latency or time-sensitive systems, the loss of the data link and subsequent link retraining may result in unacceptable communication latency or delays. Preceding techniques to address ESD-related issues include reducing interference between clock traces and medium access points on a physical layer of the receiver or moving filter taps of the receive channel in the time domain. These preceding solutions, however, only work up to certain levels of injected voltage or reduce an effective size of the filter, which results in further SNR degradation of the receive channel.

This disclosure describes apparatuses and techniques for implementing various aspects of adaptive frame alignment. In contrast with preceding mitigation techniques for ESD-related link drops, the described apparatuses and techniques may implement adaptive frame alignment to realign an incoming data stream at receiver in data mode. In various aspects, a receiver includes an adaptive frame aligner that can alter or change time alignment of an incoming signal or stream of symbols by which the data is encoded. In some implementations, the adaptive frame aligner and associated components are incorporated in a frame synchronization block of a physical layer or PHY of the receiver (e.g., as an IEEE 802.3ch compliant PHY). Generally, the adaptive frame aligner described throughout this disclosure may enable detection of frame or symbol misalignments, and the realignment of symbols via a symbol buffer to address the frame misalignment while the receiver operates in the data mode. Thus, the described aspects of adaptive frame alignment may enable shifting of data symbols at a receiver to realign line-side coding frames.

In aspects, the adaptive frame aligner can interact with components of a receiver to implement the techniques of frame realignment described herein. In some implementations, a Reed-Solomon (RS) decoder of a receiver can determine a number of corrected or valid RS frames and a number of invalid RS frames (e.g., one or more invalid frames). For example, when communicating through a high noise environment (e.g., EMI, ESD, electrical transients, etc.), noise can disrupt clock synchronization of the receiver resulting in invalid frames, which the RS decoder can monitor or track. An adaptive frame aligner, implemented as part of a time synchronizer block, can determine based on this information from the RS decoder an RS frame start pointer location of a symbol buffer (e.g., data FIFO buffer) through which received symbols pass through and/or are buffered for decoding. In aspects, the adaptive frame aligner implements an alignment algorithm for aligning or realigning misaligned frames, which may enable the successful decoding of the frames or prevent dropping of the data link. For example, RS-forward error correction (RS-FEC) frames can be considered misaligned if there are uncorrectable RS-FEC frames while an SNR of the frames indicates that the RS-FEC frames are correctable by the RS decoder. In other words, the adaptive frame aligner may detect a misalignment when there is no correctable or valid RS-FEC frame for a given number of frames yet the SNR for the frames indicates that the frames should be correctable by the decoder or valid.

When a misalignment is detected, the adaptive frame aligner can alter or shift the frame start pointer of the symbol buffer by at least one symbol and then recheck for the misalignment in subsequent frames formed from the realigned symbols. If the misalignment is detected in subsequent frames, the adaptive frame aligner can again alter or shift the frame start pointer of the symbol buffer by at least one symbol (e.g., one symbol in a same shift direction or two symbols in an opposite direction from a previous shift). In some implementations, a shift value for the pointer is determined such that the shift value would move the pointer to the closest untested starting pointer location to the original starting location of the FIFO buffer. The adaptive frame aligner can repeat this frame alignment algorithm until the misalignment is resolved in subsequently processed frames and the RS decoder is able to decode data from the RS frame of realigned symbols. By realigning the symbols of the RS frames, the adaptive frame aligner enables the RS decoder to decode a frame that would typically be misaligned due a noise-induced time or cycle slip, which can be effective to prevent a link drop and allow data communications to continue with minimal disruption.

Thus, aspects of adaptive frame alignment may enable the detection and correction of frame misalignments while in data mode in real time, thereby avoiding a link drop. In some implementations, the adaptive frame aligner may improve receiver and/or RS decoder performance in high noise environments (automotive, industrial, medical, data centers) by correcting frame misalignments caused by noise (e.g., EMI, ESD) and preventing drops of the communication link when time synchronization errors occur. Generally, the described aspects may implement the detection and correction of frame misalignments quickly relative to link retraining associated with reestablishment of a dropped link. For example, the described aspects of adaptive frame alignment may realign symbols of a frame for successful decoding in less than one microsecond, whereas link retraining may take one second or approximately 100,000 times longer than adaptive frame realignment. Additionally, adaptive frame alignment features may be added to a receiver through minimal and low-cost hardware additions (e.g., a symbol buffer and alignment block) that leverage an existing decoder, without the need of an additional FEC decoder for detection. As such, aspects of adaptive frame alignment may improve receiver resilience to transient voltage events with minimal increases in hardware costs and complexity.

In some aspects, an adaptive frame aligner detects a failure by a decoder to decode a frame formed from first symbols that are stored in or passed through a buffer. In response to the failure to decode, the adaptive frame aligner alters a pointer of the buffer to realign the symbols of a subsequent frame formed from second symbols stored in the buffer. The decoder can then reattempt to decode the realigned symbols of the subsequent frame to provide decoded data of the subsequent frame. If the decoding attempt of the subsequent frame fails, the adaptive frame aligner can alter the pointer again to provide a different realignment of the symbols for another subsequent frame and the process may repeat until the decoder is able to decode the realigned symbols of the other subsequent frame. By so doing, the adaptive frame aligner may enable the decoder to decoder the frame without resetting a data link, thereby avoiding data loss or a data link interruption.

The following discussion describes operating environment, configurations, techniques that may be employed in the operating environment, and a System-on-Chip (SoC) in which components of the operating environment may be embodied. In the context of the present disclosure, reference is made to the operating environment, techniques, or various components by way of example only.

Operating Environment

FIG. 1 illustrates an example operating environment 100 having computing devices 102 and a network device 104, either of which can implement aspects of adaptive frame alignment in accordance with one or more aspects. Generally, the computing devices 102 and network device 104 are capable of communicating data, symbols, packets, protocol data units (PDUs), and/or frames over a network connection 106, such as a wired local-area-network (LAN) or controller-area-network (CAN). The LAN or network connected devices 102, 104 may operate and communicate over respective network connections 106 in accordance with various Institute of Electronics and Electrical Engineers (IEEE) 802.3 standards, which may include IEEE 802.3, IEEE 802.3cd, IEEE 802.3ch, IEEE 802.3by, IEEE 802.3cy, or the like. Alternately or additionally, the network connection 106 or other wired connections of the devices may be implemented as a peer-to-peer network, a mesh network, or a wireless network. In aspects, the network connection 106 may represent any suitable type of wired, conductor-based, cable-based, or optical-based connection, which may include an Ethernet connection, CAN bus connection, serial connection, fiber connection, or the like.

In this example, the computing devices 102 include a laptop computer 108, a desktop computer 110, a server 112, and a set-top box 114. Further examples of a computing devices 102 (not shown) may include a tablet computer, a data storage appliance, a wearable smart-device, an IP-enabled television, a content-streaming device, a high-definition multimedia interface (HDMI) media stick, a smart appliance, a home automation controller, a smart thermostat, an Internet-of-Things (IoT) device, a mobile-internet device (MID), a network-attached-storage (NAS) drive, a server blade, a gaming console, an automotive entertainment device, an automotive computing system, an automotive control module (e.g., engine or power train control module), and so on. Generally, the computing device 102 may communicate or store data for any suitable purpose, such as to enable functionalities of various applications (e.g., social media), enable services (e.g., search), store or device data, process data, enable network access, implement gaming platforms, stream media data, provide navigation information, host content creation or editing services, and the like.

An example of the network device 104 may include a network switch 116, which may enable communication between the computing devices 102 and/or data networks (not shown) through respective network connections 106 with each of the computing devices. Although not shown, the network switch 116 may be coupled with a data network or device that acts as a gateway for the data network (e.g., cable or fiber modem), such that the computing devices 102 may communicate data with other devices or the data network (e.g., the Internet) to which the network switch 116 is coupled. Other examples of a network device 104 may include a router, an access point, a firewall device, a gateway, a network accelerator, a modem, or the like.

In aspects, the network switch 116 includes a processor 118, computer-readable storage media (CRM, not shown), a media access control layer 120, and a physical layer 122 (PHY 122). The processor 118 is configured to execute processor-executable instructions and the CRM stores data and instructions of the network device. The processor 118 can be implemented as any suitable type of processor (e.g., x86 or ARM) and/or with any suitable number of processing cores, which may be configured for general purpose or dedicated functions. The CRM of the network device 104 may include any suitable type and/or combination of storage media, such as read-only memory (ROM), random access memory (RAM), or Flash memory. The CRM can store firmware, an operating system, or applications of the network device 104 as instructions that are executed by the processor 118 to implement various functionalities of the network device 104. In this example, the processor 118 of the network device may execute firmware from the CRM to implement functions of a network controller to route data communications between the computing devices 102, other network endpoints, and/or data networks via respective network connections or data links.

The MAC layer 120 and a logical link control (LLC, not shown) layer of the network device 104 can enable node-to-node data transfers between two connected network nodes, such as one or more of the computing device 102. Additionally, the MAC 120 may provide flow control and/or handle error correction from the physical layer. The PHY 122 can provide a media independent interface to the MAC layer 120 and include functions or components to implement serialization, auto negotiation, link training, and so forth. In this example, the PHY 122 is illustrated with a Reed-Solomon forward error correction decoder 124 (RS-FEC decoder 124), adaptive frame aligner 126, serializer/deserializer 128 (SerDes 128), and may include other blocks or components that are omitted from this example for visual brevity. For example, the PHY 122 may also include a physical coding sublayer (PCS), physical medium attachment (PMA), and physical medium dependent (PMD) to implement these functions, and enable the transmission and reception of a unstructured raw bit stream over a physical medium via the SerDes 128 being coupled to a physical port or interface of a device.

As shown in FIG. 1, the PHY 122 includes the RS-FEC decoder 124 and adaptive frame aligner 126 (frame aligner 126), which may be implemented in association with other components of the PHY 122 and/or the MAC layer 120. Alternatively or additionally, the PHY 122 may include or implement other types of decoders, such as a Bose-Chaudhuri-Hocquenghem (BCH) code decoder, a Hamming code decoder, or a Fire code decoder. Generally, the RS-FEC decoder 124 or another decoder of the PHY 122 is configured to decode data of frames of symbols received by the PHY 122. The RS-FEC decoder 124, frame aligner 126, and other components of the PHY 122 may be configured in any suitable fashion, examples of which are described throughout the disclosure.

In aspects, the frame aligner 126, which may be implemented as part of a time synchronizer block of the PHY 122 and with a symbol buffer (not shown), can align or realign symbols of frames to enable decoding of the frames (e.g., misaligned frames) by the RS-FEC decoder 124 to provide decoded data. To do so, the frame aligner 126 can implement an alignment algorithm for aligning or realigning symbols of misaligned frames. For example, when a misalignment is detected, the frame aligner 126 can alter or shift a frame start pointer of the symbol buffer by at least one symbol and then recheck subsequent frames for misalignment or invalid status. If detection of the frame misalignment or invalidity continues, the frame aligner 126 can again alter or shift the frame start pointer of the symbol buffer by one symbol (e.g., one symbol in a same shift direction or two symbols in an opposite direction from a previous shift). In some implementations, a shift value for the pointer is determined such that the shift value would move the pointer to the next closest untested starting pointer location to the original starting location of the buffer. The frame aligner 126 can repeat this frame alignment algorithm until the misalignment is resolved and the RS-FEC decoder 124 is able to decode data from subsequent RS-FEC frames of the realigned symbols. By realigning the RS-FEC frames, the frame aligner 126 enables the RS-FEC decoder 124 to decode frames that would be typically misaligned, which can be effective to prevent a link drop in the case of clock or cycle slips in the receive path.

Returning to the computing devices 102, a computing device 102 may be implemented with a processor 130 and computer-readable storage media 132 (storage media 132). The processor 130 may be implemented as any suitable type or number of processors, either single-core or multi-core, for executing instructions or commands of an operating system or other applications of the computing device 102. The storage media 132 may include memory and/or a storage system of the computing device 102. The memory of the computing device 102 may include any suitable type or combination of volatile memory or nonvolatile memory. For example, the volatile memory of computing device 102 may include various types of RAM, dynamic RAM (DRAM), static RAM (SRAM), or the like. The non-volatile memory may include ROM, electronically erasable programmable ROM (EEPROM), solid-state storage media, or Flash memory. The computing device 102 also includes a network interface 136 with a controller 138, a MAC layer 120, and a PHY 122, though the network interface 136 may include alternative or additional components not shown in this example implementation.

Generally, the controller 138 can be implemented by a processor or microcontroller of the network interface 136 to provide a data interface between the network interface 136 and a host system executing on the processor 130 of the computing device 102. The MAC layer 120 and PHY 122 of the computing device 102 can be implemented similarly to or differently from the MAC layer and PHY as described with reference to the network device 104. In this example, the PHY 122 of the computing device 102 includes respective instances of an RS-FEC decoder 124, frame aligner 126, and a SerDes 128, which can be implemented as described with reference to those of the network device 104. Accordingly, either one of a computing device 102 or network device 104 may implement aspects of adaptive frame alignment as described throughout this disclosure.

Figure 2:
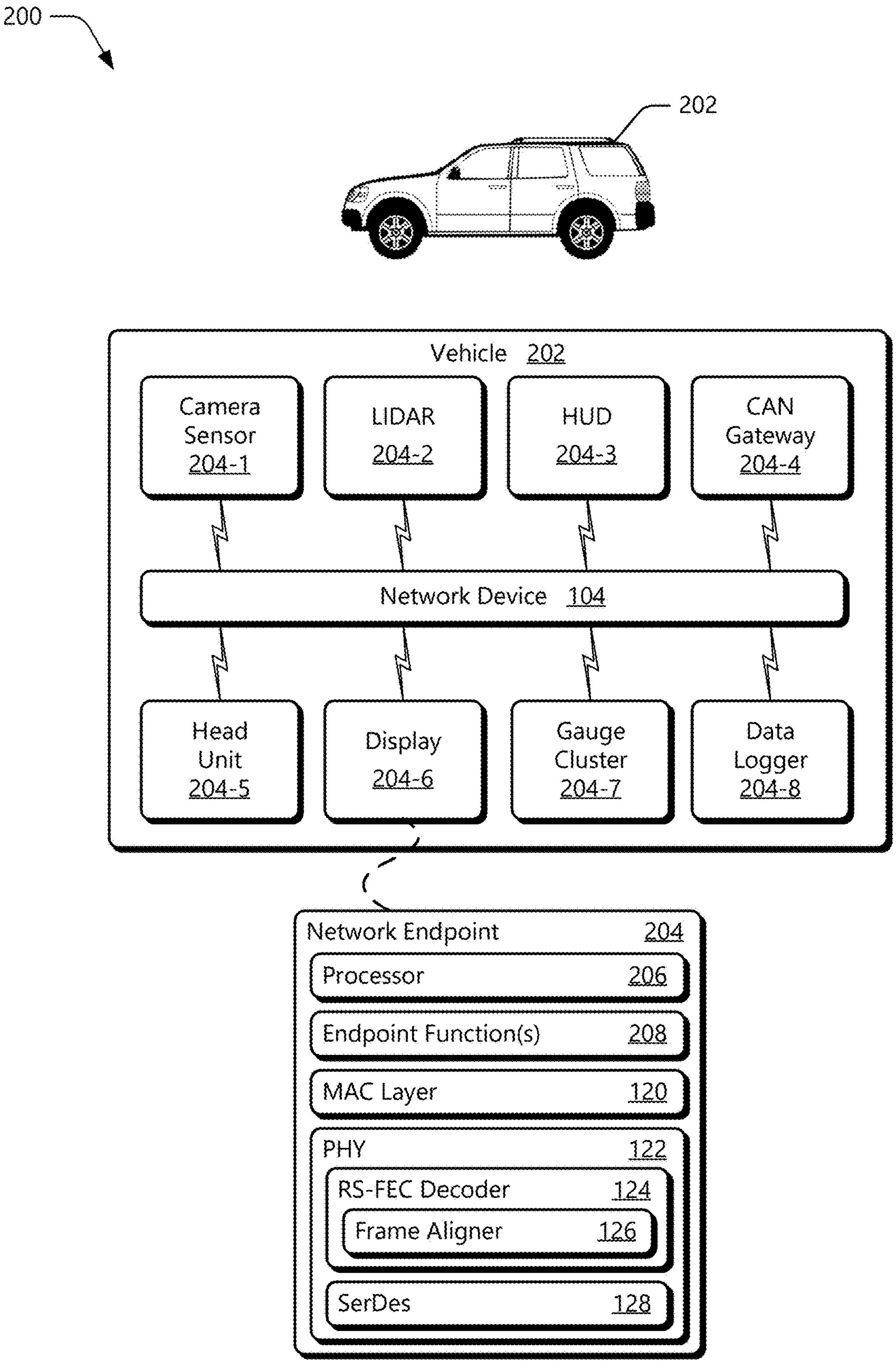
FIG. 2 illustrates an example networking environment in which network devices may implement aspects of adaptive frame alignment.

FIG. 2 illustrates at 200 an example networking environment in which network devices may implement aspects of adaptive frame alignment. In this example, the example networking environment 200 may include a networked automotive environment in the context of a vehicle 202, which may be configured as an in-vehicle network (IVN) that may include a LAN (e.g., Ethernet) and/or controller-area-network (CAN). In some implementations, the network environment includes an Ethernet-based IVN, which may be coupled to a CAN-bus or CAN-endpoints via Ethernet-to-CAN gateways. Generally, the vehicle 202 may include an IVN implemented on an IEEE 802.3 compliant Ethernet framework that connects various network endpoints 204 of the vehicle 202 through respective network connections with a network device 104 or other suitable network connection.

The Ethernet framework of a vehicle may be configured to operate in accordance with any suitable standard, which may include 1000BASE-T1, 2.5GBASE-T1, 5GBASE-T1, 10GBASE-T1, MultiGBASE-T1, and so forth. Thus, any port or interface of the IVN or Ethernet-based network may be implemented with a MAC layer 120 and/or PHY 122 as described herein with a frame aligner 126. Although described in the context of an automotive environment, aspects of adaptive frame alignment may be deployed in other suitable environments to improve receiver performance, which may include industrial environments, data center environments, marine environments, medical environments, or the like. Alternatively or additionally, the aspects of adaptive frame alignment may also be implemented by a receiver and/or decoder configured to operate in compliance with one or more CAN-bus related standards (e.g., ISO 11898, SAE J1939, CANopen, etc.).

By way of example, a typical modern automobile may include dozens of electronic control units (ECUs), sensors, actuators, indicators, or the like for various vehicle systems. In the context of FIG. 2, the ECUs or systems of the vehicle 202 are represented by the network endpoints 204 coupled by the Ethernet-based IVN implemented at least in part through the network device 104. Generally, a vehicle system may include a processor-based control unit to implement or manage functions of the system. Some example vehicle systems may include an engine control, a transmission control system, an air bag system, an anti-lock braking system (ABS), cruise control system, electronic power steering, an audio system, power windows, power door locks and access, mirror adjustment, a charging system for a hybrid/electric, and so forth. Although ECUs of some of these systems form an independent subsystem, an ECU often communicates with other ECUs of the vehicle. For example, a passenger access control subsystem may need to control an actuator or receive feedback from a sensor of other subsystems to actuate windows, doors, or a lift gate of the vehicle.

In aspects, the vehicle 202 may include an Ethernet-based IVN that operably couples any suitable number and/or type of network endpoints 204. In this example, the illustrated systems or network endpoints 204 of the vehicle 202 include a camera sensor 204-1, a laser detection and ranging (LIDAR) system 204-2, a heads up display (HUD) system 204-3, a CAN gateway 204-4, stereo head unit 204-5, a display system 204-6, a gauge cluster 204-7, and a vehicle data logger 204-8. In other cases, the vehicle 202 may be configured with additional or alternative combinations of systems and network endpoints 204 that are communicatively coupled directly or indirectly (e.g., through a CAN gateway) via an Ethernet-based IVN. Generally, a network endpoint 204 may be implemented with a processor, a network interface, and various components or circuitry associated with functionalities of the network endpoint. As shown in FIG. 2, a generic example of a network endpoint 204 can be configured with a processor 206, one or more endpoint functions 208, a MAC layer 120, and a PHY 122. The processor 206 or a microcontroller of the network endpoint may execute firmware or interact with hardware of the network endpoint 204 to provide the endpoint function 208.

A network endpoint 204 may be configured to implement any suitable endpoint function 208 (e.g., vehicle system), such as engine control, transmission control, sensor feedback, actuator control, and so forth. Generally, to enable operation and various functions of the vehicle, the network endpoints 204 (e.g., ECUs and sensors) of the vehicle 202 communicate data frames over the Ethernet-based IVN using the MAC layer 120 and the PHY 122. The MAC layer 120 and PHY 122 of the network endpoint 204 can be implemented similarly to or differently from the MAC layer and PHY as described with reference to the computing device 102 and/or network device 104. In this example, the PHY 122 of the network endpoint 204 includes respective instances of an RS-FEC decoder 124, frame aligner 126, and a SerDes 128, which can be implemented as described with reference to those of the computing device 102 and/or the network device 104. Accordingly, the network endpoint 204 of the vehicle 202 may also implement aspects of adaptive frame alignment as described throughout this disclosure.

Figure 3:
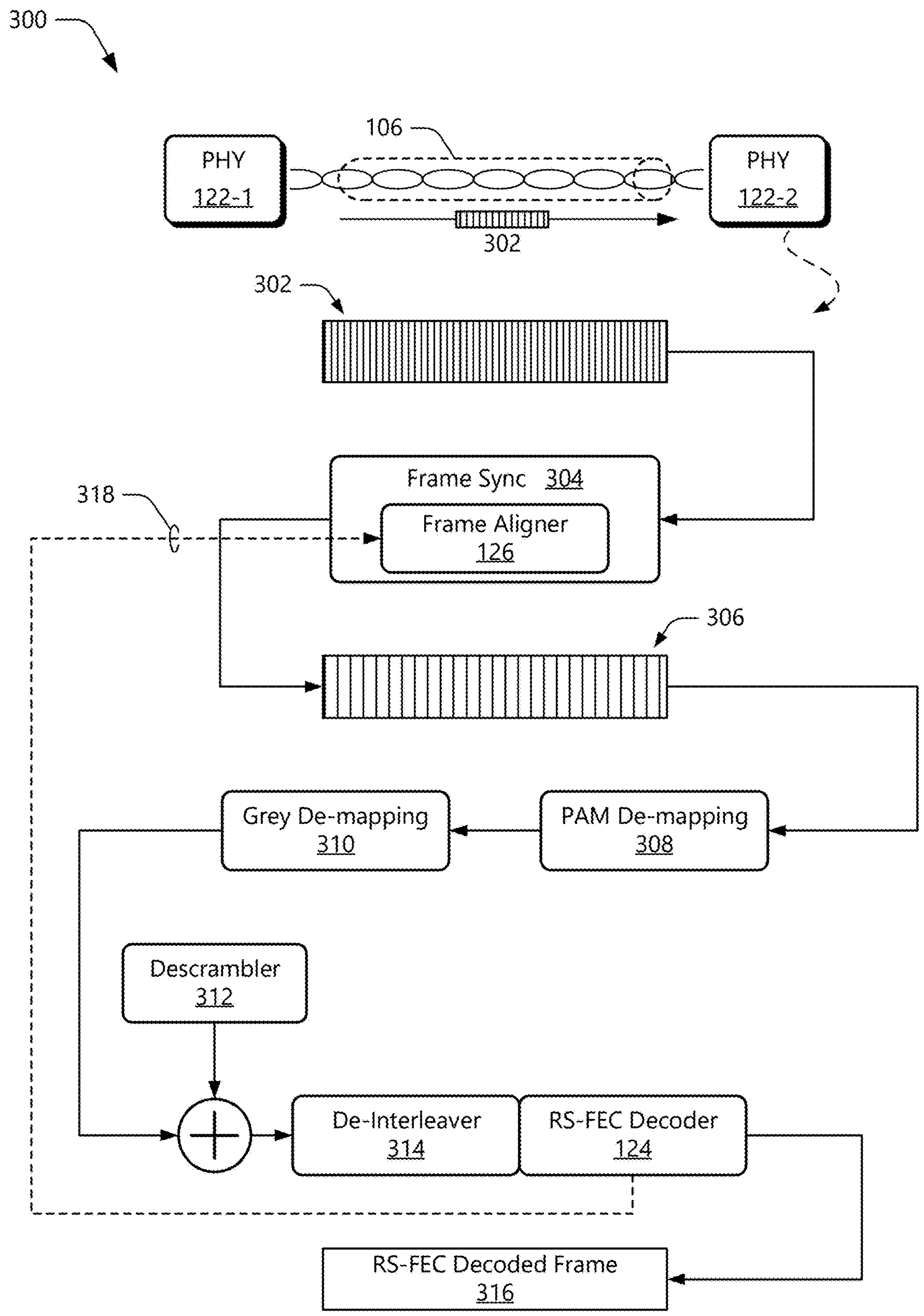
FIG. 3 illustrates an example data receiving path in which aspects of adaptive frame alignment can be implemented.

FIG. 3 illustrates at 300 an example data receiving path in which aspects of adaptive frame alignment can be implemented. The components of the example data receiving path 300 may be implemented in any of the devices described with reference to FIGS. 1-3, which may include a computing device 102, a network device 104, an Ethernet-based IVN, or a network endpoint 204. Generally, the components of the data receiving path 300 may be implemented or operate to decode symbols 302 transmitted over a network connection 106 between respective PHYs 122-1, 122-2 of network-enabled devices. The symbols 302 may encode data and/or other control information using any suitable modulation or coding scheme, which may include pulse-amplitude modulation (PAM), PAM3, PAM4, PAM5, PAM16, or the like. In other aspects, adaptive frame alignment may be implemented with other types of modulation, such as quadrature-amplitude modulation, frequency modulation, phase modulation, and so forth. In aspects, the frame aligner 126 and other components of FIG. 3 may enable a device or network interface to implement aspects of adaptive frame alignment to realign symbols of data frames to enable decoding of the frames with realigned symbols, which may preclude the need to retrain a data link to recover from a time slip or cycle slip that disrupts the alignment of symbols with frames received by the device.

As shown in FIG. 3, a PHY 122 receives symbols 302 (e.g., PAM4 symbols) over the network connection 106. In some cases, the symbols 302 are received via the SerDes interface and physical medium attachment (PMA) service interface of the PHY 122. Generally, a frame synchronization block 304 of the PHY 122 can form or group the symbols 302 into a received frame 306, which may include a predefined number of the symbols 302 to form the frame 306. Thus, the frame synchronization block 304 may be configured to form frames 306 with a predefined number of symbols 302 of a stream of incoming symbols and using a frame start point, which may be determined during data link training with a link partner (e.g., data transmitter). The frame synchronization block 304 provides the received frame 306 of symbols 302 to a pulse-amplitude modulation de-mapping block 308 (e.g., PAM4 de-mapping), which in turn provides the PAM de-mapped frame to a grey de-mapping block 310. After PAM de-mapping and grey de-mapping, the frame passes through a descrambler 312 and de-interleaver 314 before decoding by an RS-FEC decoder 124 of the PHY 122. Based on successful decoding by the RS-FEC decoder 124, an RS-FEC decoded frame 316 is provided by the data receive path 300 for further decoding and processing by components of the PHY 122 and/or MAC layer 120 toward a media independent interface.

In aspects, the frame synchronization block 304 includes an instance of a frame aligner 126, which may alter or adjust a grouping of symbols from which a frame is formed to realign the symbols of the frame. In some implementations, the frame aligner 126 is communicatively coupled with the RS-FEC decoder 124 and can receive an indication 318 from the decoder when a decoding failure occurs. For example, when a frame, such as a FEC frame, cannot be decoded or is invalid due to a misalignment, the frame aligner 126 receives the indication 318 from the RS-FEC decoder 124. Based on the indication 318 of a decode failure, the frame aligner 126 can implement aspects of adaptive frame alignment to realign symbols of subsequently formed frames, which may resolve a misalignment of frame symbols without dropping the data link with the transmitter or retraining the data link to reestablish frame synchronization timing.

Figure 4:
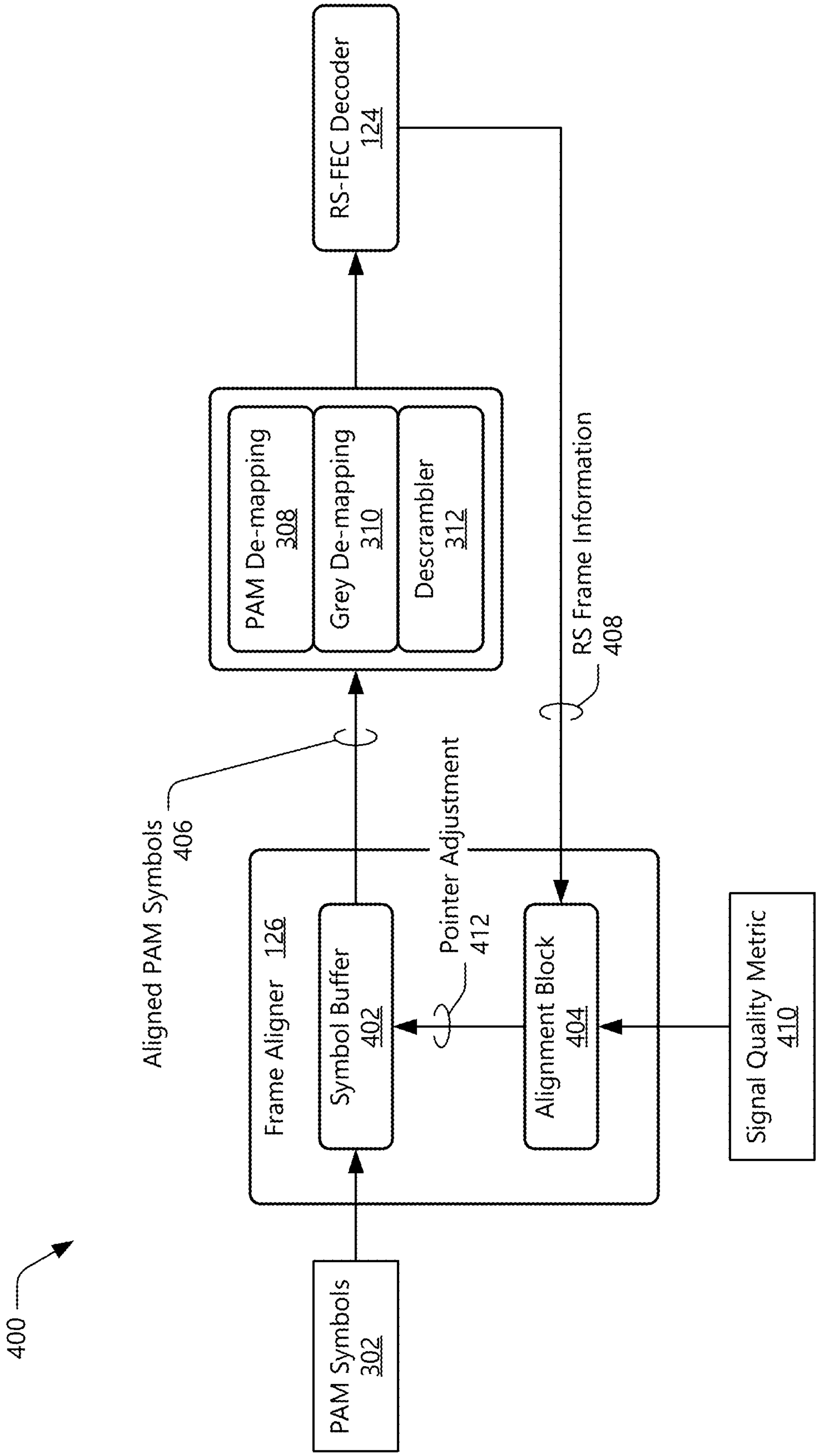
FIG. 4 illustrates an example configuration of an adaptive frame alignment block in accordance with one or more aspects.

By way of example, consider FIG. 4 which illustrates at 400 an example configuration of an adaptive frame alignment block (e.g., frame aligner 126) in accordance with one or more aspects. In aspects, an adaptive frame alignment block (frame aligner 126) includes a symbol buffer 402 configured to buffer or queue symbols received by a PHY and a frame alignment block 404 (alignment block 404) configured to alter or adjust an alignment of symbols provided by the adaptive frame alignment block (or frame synchronization block). The buffer may be configured to store or buffer any suitable number of symbols, such as ten to fifty symbols, or a number of symbols that is less than a size of a frame formed the symbols that pass through the buffer (e.g., buffer size<frame size). In some cases, the realigned symbols are provided to or realigned within a frame synchronization block, which forms the realigned symbols into frames for further processing and decoding by component of the PHY 122 (e.g., FIG. 3). The symbol buffer 402 of the frame aligner 126 may include any suitable type of buffer, queue, or data storage element, which may include a first-in, first-out (FIFO) buffer, a circular buffer, a ring buffer, a symbol queue, a symbol array, or the like.

Generally, the symbol buffer 402 may operate by a pointer, such as a read pointer or output pointer, which can be moved forward and/or backward through symbols stored or buffered by the buffer to align or realign a plurality of symbols used to form a frame. In aspects, the alignment block 404 of the frame aligner 126 may be operably coupled with the symbol buffer 402, the RS-FEC decoder 124, and/or an analog signal measurement block of the PHY 122 (not shown). As described herein, the alignment block 404 may implement various algorithms for implementing aspects of adaptive frame alignment, which may include an algorithm for detecting a symbol misalignment within frames or an algorithm for realigning symbols of frames.

In the context of FIG. 4, the frame aligner 126 or a frame synchronization block (not shown) can receive PAM symbols 302 from a SerDes or slicer of the PHY 122. Generally, the frame aligner 126 and/or frame synchronization block can provide frames of aligned (or realigned) PAM symbols 406 to de-mapping or descrambling blocks of the PHY 122, which in this example include a PAM de-mapping block 308, grey de-mapping block 310, and descrambler 312. The RS-FEC decoder 124 then receives the frames of de-mapped and/or descrambled symbols (e.g., FEC frames) for decoding. When the RS-FEC decoder 124 successfully decodes the FEC frames, the decoder can provide the decoded frame contents to a next data decoding or processing block of the PHY 122 or MAC layer 120. Alternatively, when the RS-FEC decoder 124 fails to decode a FEC frame, the decoder may provide an indication (e.g., indication 318) or alert of the decoding failure to the frame aligner 126, which may in turn implement aspects of adaptive frame alignment as described herein.

In aspects, alignment block 404 of the frame aligner 126 receives RS frame information 408 from the RS-FEC decoder 124 or signal quality metric 410, such as from an analog signal measurement block of the PHY 122. The RS-FEC decoder 124 may provide any suitable information or metrics, which may include a number of one or more value RS frames, a number of one or more invalid RS frames, an indication of one or more decoding failures, an indication of one or more frame misalignments, or the like. In some implementations, an analog signal measurement block (e.g., PMA, not shown) or other component of the PHY 122 provides a signal quality metric, for the symbols or frames received by the PHY. Examples of signal quality metrics that may be provide to the alignment block 404 includes a signal-to-noise (SNR) ratio, a bit-error rate (BER), a received-power level, or the like.

In aspects, the alignment block 404 may determine, based on the RS frame information 408 and/or the signal quality metric 410, that a decoding failure may relate to misaligned symbols of a frame and implement an adaptive frame alignment correction algorithm to realign symbols of the frames provided by the frame synchronization block. To do so, the alignment block 404 may provide a pointer adjustment 412 to the symbol buffer to align or realign symbols from which symbols are formed by the frame synchronization block. In some cases, the adjustment of the buffer pointer is effective to realign symbols of subsequent frames passing through the symbol buffer such that frame synchronization block forms or provides valid FEC frames of realigned symbols that the RS-FEC decoder 124 is able to decode.

Figure 5:
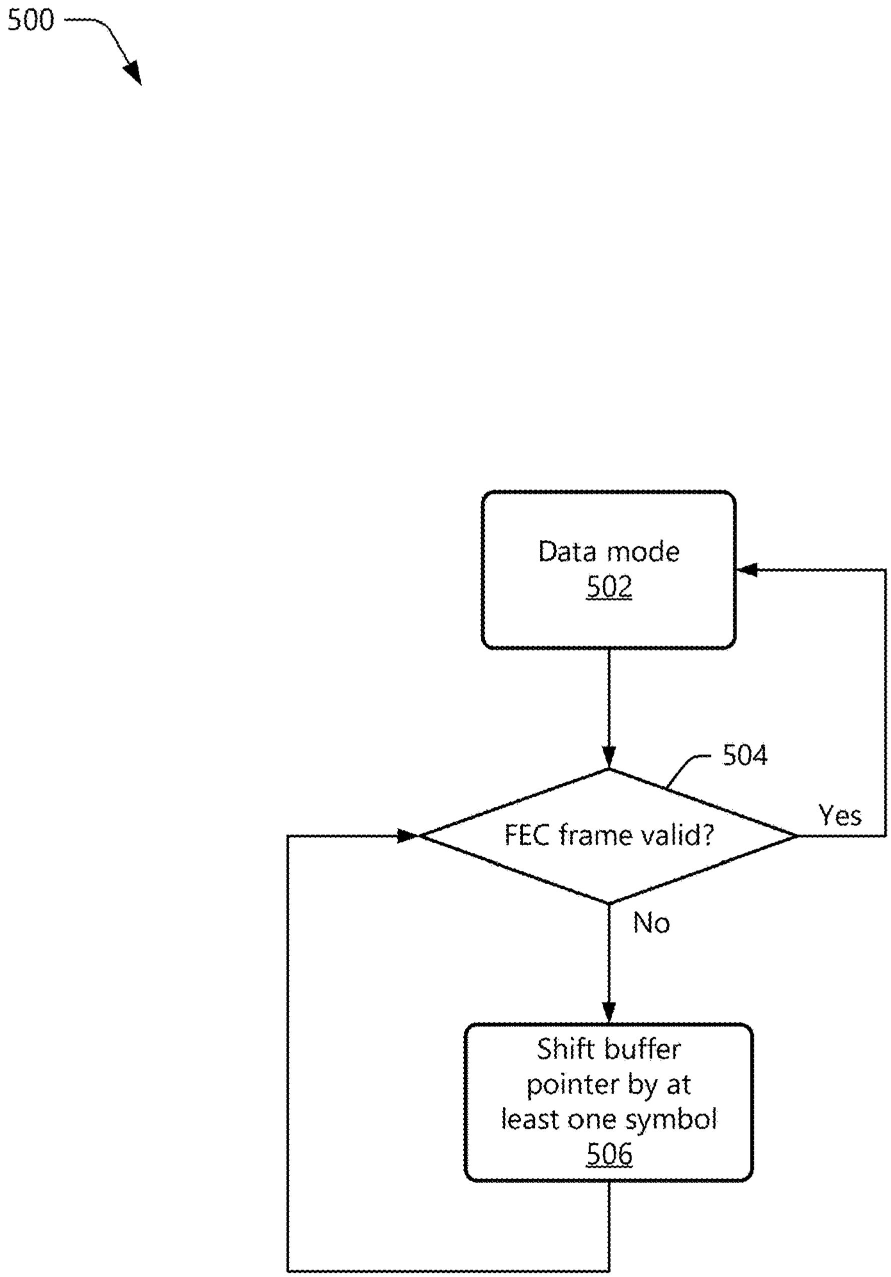
FIG. 5 illustrates an example flow chart of an alignment correction algorithm implemented in accordance with aspects of adaptive frame alignment.

FIG. 5 illustrates at 500 an example flow chart of an alignment correction algorithm implemented in accordance with aspects of adaptive frame alignment. Generally, the alignment correction algorithm may be implemented by the frame aligner 126 while a PHY of a receiver operates in data mode 502 and receives a stream of symbols (e.g., PAM symbols) via a wired interface. In some implementations, during initialization of the correction algorithm, the frame aligner 126 may initially set a read pointer of a symbol buffer (e.g., FIFO buffer) to a middle of the symbol buffer size (e.g., a seventh or eighth symbol position in a 16-symbol buffer), which may allow for symbol realignment in either a positive direction (moving forward) or a negative direction (moving backward). In alternative implementations, the frame aligner 126 may initially set a read pointer of a symbol buffer (e.g., FIFO buffer) to one end of the buffer, such as when a frame aligner and/or symbol buffer are configured to implement symbol realignment in one direction or to start with symbol realignments in the one direction. In various aspects, a length of the symbol buffer and/or a starting position and/or predefined reset position of the pointer of the buffer can be configurable, such as through firmware settings of the PHY.

In aspects, the correction algorithm may operate in data mode at 502 and monitor a state of FEC frame decoding at 504 to determine whether the FEC frames being decoded are valid FEC frames or invalid FEC frames. Additional details of the detection portion of the algorithm are described with reference to FIG. 6 which describes a detection algorithm and FIGS. 7-9 which describe methods for adaptive frame realignment. When an FEC frame is valid at 504, the algorithm may continue to operate in the data mode at 502 and continue checking the validity of the FEC frames as the RS-FEC decoder 124 continues to decode the FEC frames in data mode. Alternatively, when a FEC frame is not valid at 504, the frame aligner 126 may implement adaptive alignment of symbols of subsequent frames. In other words, when the frame aligner 126 determines that the symbols of a frame that went through decoding are misaligned, the frame aligner can alter or adjust an alignment of symbols used by a frame synchronization block for form subsequent frames that will reach the decoder.

As shown at 506, the frame aligner 126 shifts a pointer of the symbol buffer by at least one symbol (e.g., PAM symbol). This may include advancing the pointer of the buffer forward one symbol to add a symbol in the buffer to a frame or moving the pointer of the buffer backward one symbol to skip or omit a symbol in the buffer from the frame. After the frame aligner 126 shifts the pointer of the buffer to realign the symbols of a subsequent frame (relative the frame that failed decoding), the algorithm returns to 504 to check whether the misalignment of the subsequent frame has been resolved. If the misalignment of the frame is resolved and the frame is a valid FEC frame, the algorithm returns to 502 to continue processing frames in data mode. Alternatively, if the subsequent frame is not valid and/or misaligned, the algorithm returns to 506 to shift the pointer of the buffer. In some aspects, a shift value for the pointer is determined such that the shift value would move the pointer to the next closest untested starting pointer position to the original starting position of the buffer. For example, the frame aligner 126 may implement a formula of "pointer_next=−(pointer+1)" to alternately shift the pointer of the buffer forward and backward through buffer positions, such as until a valid symbol realignment for a frame is determined.

Figure 6:
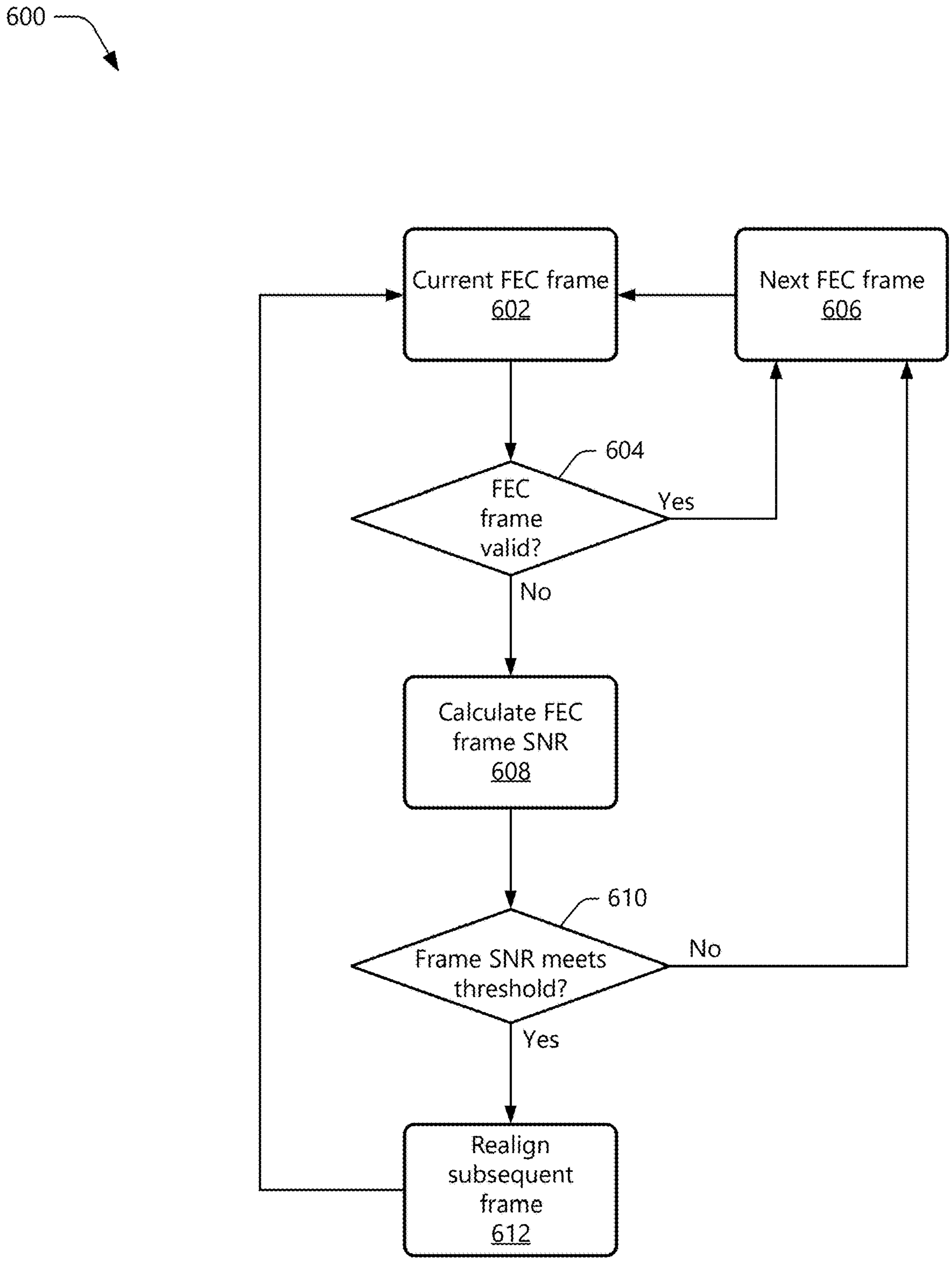
FIG. 6 illustrates an example flow chart of a frame misalignment detection algorithm implemented in accordance with aspects of adaptive frame alignment.

FIG. 6 illustrates at 600 an example flow chart of a frame misalignment detection algorithm implemented in accordance with aspects of adaptive frame alignment. In aspects, operations of the correction algorithm 500 and operations of this detection algorithm 600 may be combined, in whole or part, to implement aspects of adaptive frame alignment to realign symbols of frames for decoding. Generally, the correction algorithm 500 and detection algorithm 600 may be implemented by the RS-FEC decoder 124, frame aligner 126, and other blocks of a PHY as described herein. At 602, the RS-FEC decoder 124 decodes a current frame of symbols, such as an FEC frame provided by various sync, de-mapping, and descrambling blocks of the PHY. At 604, the RS-FEC decoder 124 determines and/or provides an indication as to whether an FEC frame is valid (or aligned). If the FEC frame is valid, the algorithm moves at 606 to a next FEC frame, which may be formed by a frame synchronization block and provided to the RS-FEC decoder as the current frame at 602 for decoding. If the FEC frame is determined to be not valid at 604, the algorithm may advance to 608 at which an FEC frame SNR is calculated.

For example, the frame aligner 126 may obtain signal quality metrics from a PMA of the PHY that includes a frame-level SNR for the FEC frame. Note that use of a frame-level SNR may enable or improve detection of frames with misaligned symbols that are otherwise decodable versus an average or per-symbol SNR metric. From 610, if the SNR of the FEC frame fails to meet a signal quality threshold (e.g., minimum SNR for frame decoding), the algorithm moves to a next FEC frame at 606 and may begin the decoding process with the new frame. In other words, if the frame-level SNR of the frame fails to meet the threshold, the frame aligner 126 may determine that the frame was not misaligned and instead failed decoding due to signal quality issues (e.g., an uncorrectable FEC frame). Alternatively, if the frame-level SNR of the FEC frame meets the threshold, indicating that the FEC frame is not uncorrectable due to signal quality, the algorithm advances to 612 to realign symbols of a subsequent frame.

In aspects, the frame aligner 126 shifts a pointer of the symbol buffer by at least one symbol (e.g., PAM symbol). This may include advancing the pointer of the buffer forward one symbol to add a symbol in the buffer to a frame or moving the pointer of the buffer backward one symbol to skip or omit a symbol in the buffer from the frame. After the frame aligner 126 shifts the pointer of the buffer to realign the symbols of the subsequent frame (relative the frame that failed decoding), the algorithm returns to 602 with the realigned frame as the current frame for another iteration of the algorithm. These are but a few example algorithms that a frame aligner can implement in accordance with aspects of adaptive frame alignment, the operations of which can be implemented in combination with respective operations of the methods 700 through 900 as described with reference to FIGS. 7-9.

Techniques for Adaptive Frame Alignment

The following discussion describes techniques for adaptive frame alignment in accordance with various aspects. These techniques may be implemented using any of the environments and entities described herein, such as the RS-FEC decoder 124, adaptive frame aligner 126, FIFO buffer 402, and/or alignment block 404. These techniques include various methods illustrated in FIGS. 7-9, each of which is shown as a set of operations that may be performed by one or more entities of a network device.

These methods are not necessarily limited to the orders of operations shown in the associated figures. Rather, any of the operations may be repeated, skipped, substituted, or re-ordered to implement various aspects described herein. Further, these methods may be used in conjunction with one another, with the algorithms of FIG. 5 or FIG. 6, in whole or in part, whether performed by the same entity, separate entities, or any combination thereof. For example, the methods may be combined to implement adaptive frame realignment to realign symbols of frames to enable decoding of those frames, which may enable the decoder to decode the frames without retraining a data link, avoiding data loss or data link interruptions. In portions of the following discussion, reference will be made to the operating environment 100 of FIG. 1, network environment 200 of FIG. 2, and various entities, configurations, or algorithms of FIGS. 3-6, FIG. 10, and/or FIG. 11 by way of example. Such reference is not to be taken as limiting described aspects to the operating environment 100, network environment 200, entities, algorithms, or configurations, but rather as illustrative of one of a variety of examples. Alternatively or additionally, operations of the methods may also be implemented by or with entities described with reference to the SoC of FIG. 10 or network controller of FIG. 11.

Figure 7:
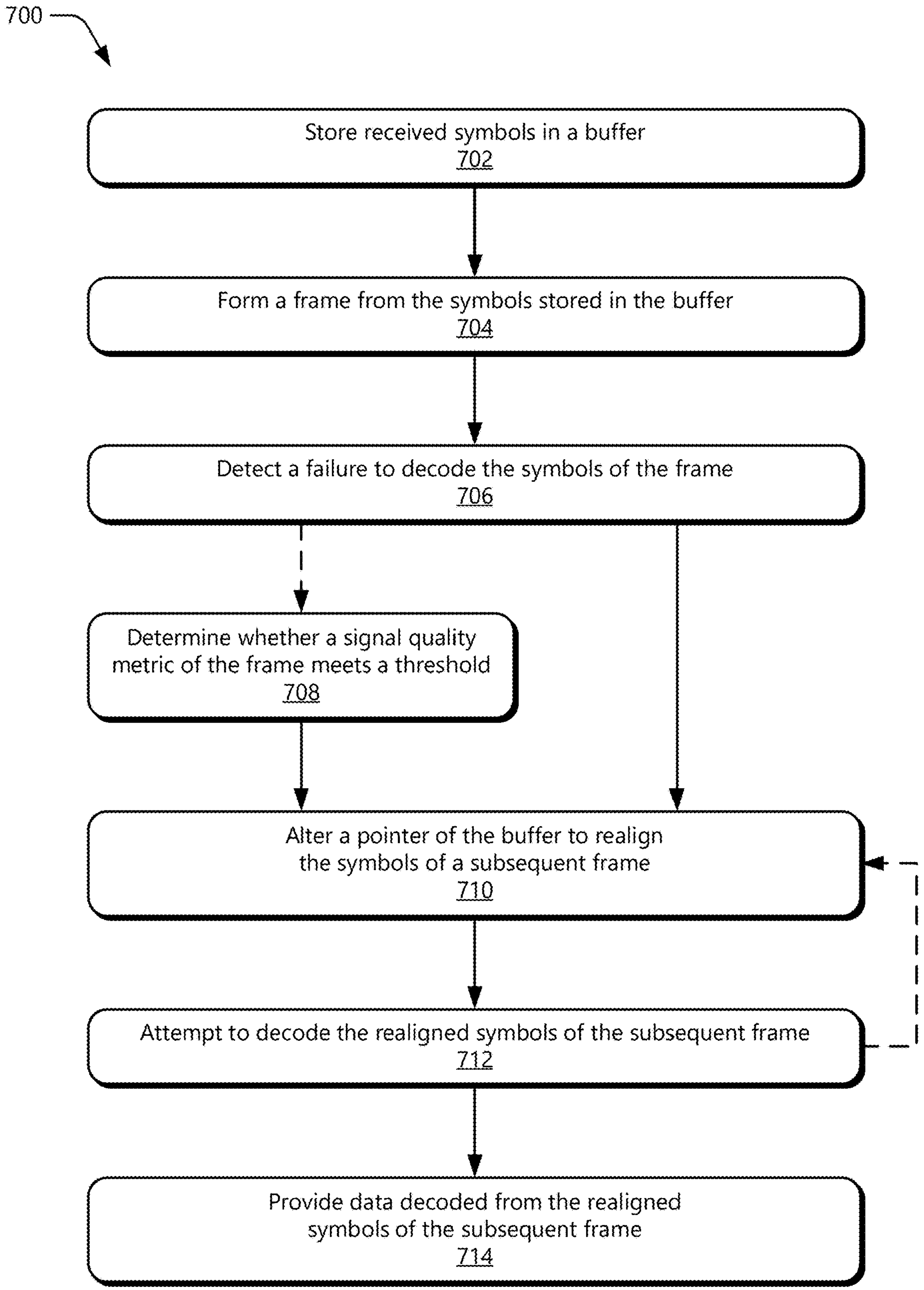
FIG. 7 depicts an example method for adaptive frame alignment in accordance with one or more aspects.

FIG. 7 depicts an example method 700 for adaptive frame alignment in accordance with one or more aspects. The operations of the method 700 may be implemented by an RS-FEC decoder 124, adaptive frame aligner 126, FIFO buffer 402, and/or alignment block 404 of a network device.

At 702, symbols received by a receiver are stored in a buffer. The buffer may be implemented as part of a frame synchronization block of a PHY, which is configured to form frames from symbols buffered by the buffer based on a read pointer or output pointer of the buffer. The buffer may include a symbol buffer configured as any suitable type of buffer or storage element, such as a FIFO buffer, a ring buffer, a circular buffer, or the like.

At 704, a frame is formed from first symbols stored in the buffer. For example, a frame synchronization block by form a frame from a first set of symbols passing through the buffer. In other words, the frame synchronization block may form a first frame of first symbols based on a current position of a read pointer of the symbol buffer. Thus, the frame synchronization block may be configured to selectively group symbols received through the buffer to form frames with respective symbols that are aligned within the frame based on the position of the read pointer or output pointer of the buffer.

At 706, a frame aligner detects a failure to decode the first symbols of the frame. The frame aligner may receive an indication of the decoding failure or an indication of an invalid frame from a frame decoder of the PHY. The decoder may be configured as any suitable type of decoder, such as a Reed-Solomon decoder, BCH decoder, a Hamming decoder code, or a Fire code decoder. In some cases, a transient voltage event may cause a time slip or cycle slip of symbols used to form the frames, and the decoding failure may be indicative of misaligned frames where timing or clocking has been interrupted.

Optionally at 708, the frame aligner may determine whether a signal quality metric of the frame meets a threshold. The signal quality metric may include a frame-level SNR metric for the frame. In some cases, the frame aligner obtains a signal quality metric from a PAM of the PHY and compares the signal quality metric to a threshold configured to indicate whether the frame is correctable.

At 710, the frame aligner alters a pointer of the buffer to realign symbols of a subsequent frame formed from second symbols stored in the buffer. The pointer of the buffer may include a read pointer or output pointer of the buffer and altering the pointer of the buffer moves the pointer one symbol forward or one symbol backward. In some cases, the altering of the pointer of the buffer is performed in response to the frame being invalid and signal quality metric of the frame indicating that the frame is correctable. Altering the position of the pointer may be effective to realign the incoming data stream at the receiver in data mode. In other words, altering or adjusting the pointer position can realign symbols of subsequent frames formed with symbols read from or output by the buffer.

At 712, the decoder attempts to decode the realigned symbols of the subsequent frame. The decoder may attempt to decoder a second frame formed from second symbols that are realigned or offset from the first symbols of the first frame. In other words, the decoder attempts to decode a second or subsequent frame of realigned symbols formed based on the altered position of the read pointer of the symbol buffer. From operation 712, the method 700 may return to operation 710 in response to a failure to decode the realigned symbols of the subsequent frame to alter the pointer of the buffer again to provide another realignment of symbols of another subsequent frame or proceed to operation 714 based on a successful decoding of the realigned symbols of the subsequent frame.

When repeating operations 710 and/or 712, the pointer of the buffer may be adjusted in any suitable fashion, such as to try a next closest untested realignment of symbols in a subsequent frame. For example, the frame aligner can move the pointer of the buffer forward one symbol to realign symbols of a second frame and then move the pointer of the buffer backward two symbols to realign symbols of a third frame (where first, second, or third frames are not necessarily adjacent or contiguous frames). In other cases, the frame aligner can move the pointer of the buffer backward one symbol to realign symbols of a second frame and then move the pointer of the buffer forward two symbols to realign symbols of a third frame (where first, second, or third frames are not necessarily adjacent or contiguous frames). This process may repeat where each iteration of pointer adjustment realigns the symbols one symbol further than a previous realignment.

At 714, the decoder provides data decoded from the realigned symbols of the subsequent frame. In other words, when the realignment of the symbols of subsequent frames re-aligns timing or alignment of the symbols within the frame, the decoder may then successfully decode the frames of realigned symbols. Note, once a viable position for the pointer of the buffer is determined, the frame synchronization block may continue to provide frames with symbols realigned based on the pointer, such that timing of a receiver path can be restored and the decoder may continue to successfully decoder subsequent frames of symbols realigned based on the pointer of the buffer.

FIG. 8 depicts an example method 800 for realigning a forward error correction (FEC) frame in accordance with one or more aspects. The operations of the method 800 may be implemented by an RS-FEC decoder 124, adaptive frame aligner 126, FIFO buffer 402, and/or alignment block 404 of a network device.

At 802, an adaptive frame aligner determines that a forward error correction (FEC) frame is not valid. For example, the RS-FEC decoder may be unable to decode the FEC frame due to a symbol misalignment. At 804, the frame aligner determines a signal quality metric for the FEC frame. In some cases, the frame aligner determines or obtains a frame-level SNR of the FEC frame, which may indicate whether the FEC frame is uncorrectable.

At 806, the frame aligner determines that the signal quality metric of the FEC frame meets a signal quality threshold. The signal quality threshold may be configured as a minimum signal quality level at which the FEC can be decoded or corrected by the RS-FEC decoder. At 808, the frame aligner adjusts a pointer of a buffer to realign the symbols of a subsequent FEC frame. When the signal quality metric indicates that the FEC frame is not uncorrectable, the frame aligner adjusts the pointer of the buffer to realign the symbols used to form subsequent FEC frames that will reach the RS-FEC decoder through the receive path.

At 810, the frame aligner determines whether the subsequent FEC frame is valid. In other words, the frame aligner may determine whether the misalignment of previous frames has been corrected by adjusting the pointer of the symbol buffer. From operation 808, the method 800 may return to operation 808 in response determining that the subsequent FEC frame is not valid or proceed to operation 812 based on a determination that the subsequent FEC frame is valid. At 812, the decoder decodes the realigned symbols of the subsequent FEC frame to provide decoded data. Note, once a viable position for the pointer of the buffer is determined, the frame synchronization block may continue to provide FEC frames of symbols realigned based on the pointer, such that timing of a receiver path is corrected and the decoder can continue decoding subsequent FEC frames of the symbols realigned based on the pointer of the buffer.

Figure 9:
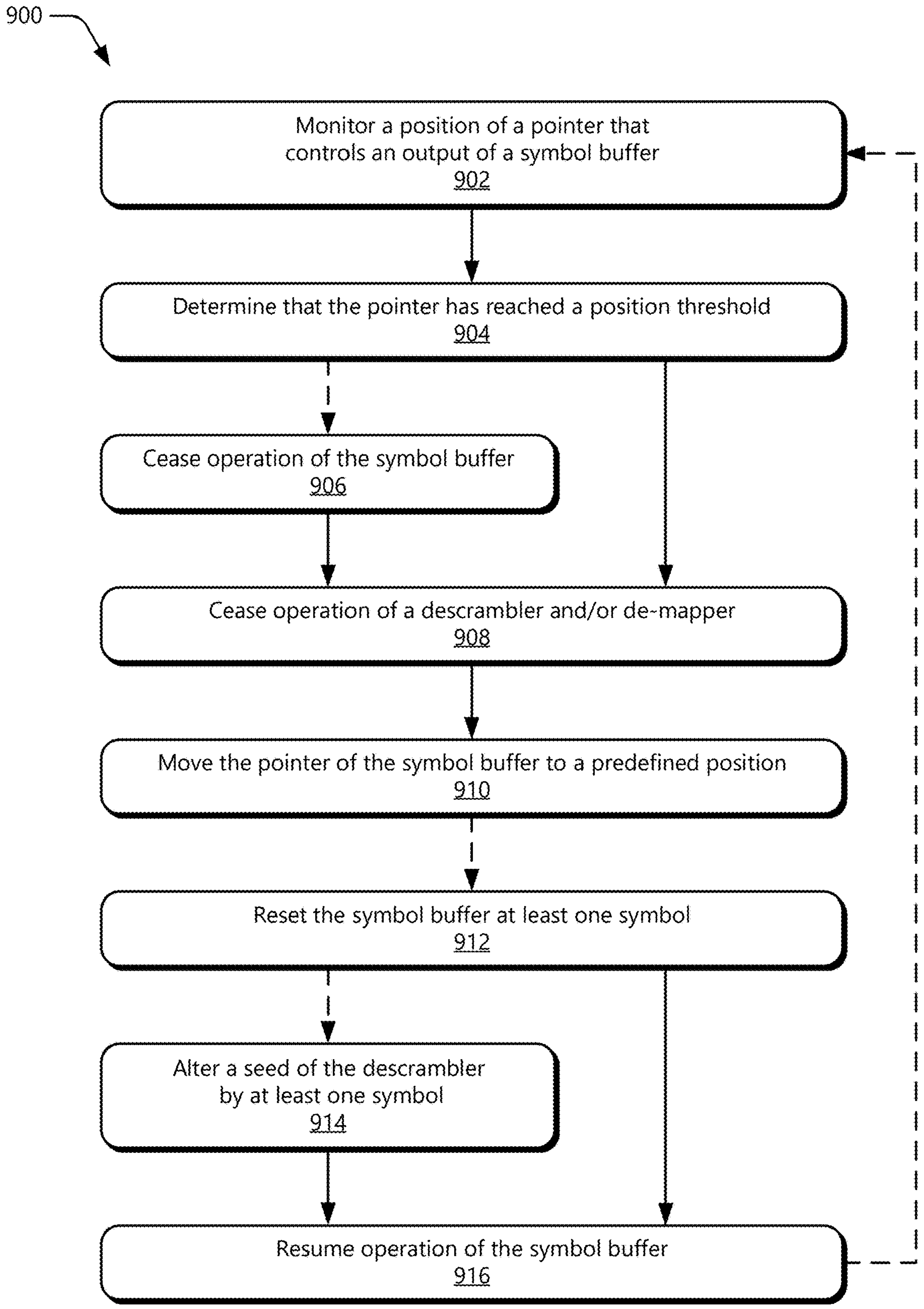
FIG. 9 depicts an example method for resetting a symbol buffer in accordance with one or more aspects.

FIG. 9 depicts an example method 900 for resetting a symbol buffer in accordance with one or more aspects. The operations of the method 900 may be implemented by an RS-FEC decoder 124, adaptive frame aligner 126, FIFO buffer 402, and/or alignment block 404 of a network device. In some cases, the pointer of the buffer (e.g., FIFO buffer) may reach or point to either end of buffer after implementing several iterations of symbol realignment. Because the pointer may not be able to move any further, resulting in realignment failure, the pointer of the buffer may be reset as described in reference to the method 900.

At 902, a frame aligner monitors a position of a pointer that controls an output of a symbol buffer. For example, the frame aligner may track the position of the pointer as the pointer is adjusted to realign symbols of FEC frames and compare the position of the pointer to a threshold or end of the buffer. At 904, the frame aligner determines that the pointer has reached a position threshold of the symbol buffer. The position threshold may be set a predetermined number of positions from an end of the buffer or may be configured as the end of the buffer.

Optionally at 906, the frame aligner ceases or halts operation of the symbol buffer in response to determining that the pointer has reached the position threshold of the buffer. At 908, the frame aligner ceases or halts operation of a descrambler and/or de-mappers, which may include those components in the receive path between a frame synchronization block and the decoder. Generally, any FEC frame being processed will be lost or corrupted during the realignment buffer reset process to reset the position of the pointer of the buffer. The frame aligner may also move the descrambler to a predefined position, which can prepare the descrambler to resume operation once the symbol buffer is reset.

At 910, the frame aligner moves the pointer of the symbol buffer to a predefined position. The predefined position may include a center or near-center position of the buffer or one end of the buffer when the frame aligner is configured to realign symbols for frames in one direction. At 912, the frame aligner resets the symbol buffer at least one symbol. In some cases, the frame aligner resets the symbol buffer a number of symbols effective to discard remaining symbols of an invalid FEC frame. For example, the frame aligner may reset the symbol buffer by a number of symbols that corresponds to a length of FEC frame minus one half a length or depth of the symbol buffer.

Optionally at 914, the frame aligner alters the seed of the descrambler by at least one symbol. In some cases, the frame aligner resets or re-seeds the descrambler by a number of symbols that correspond to the length of the FEC frame to effectively reset the descrambler from any remaining symbols of the invalid FEC that is discarded during the pointer reset process.

At 916, the frame aligner resumes operation of the symbol buffer with the pointer starting from the predefined position. As noted, the predefined position may include a center or near-center position or location of the symbol buffer. From operation 914, the method 900 may return to operation 902 to resume monitoring of the position of the pointer of the symbol buffer and repeat iterations of the method 900 as needed when the pointer encounters and end of the symbol buffer.

System-on-Chip and Controller

Figure 10:
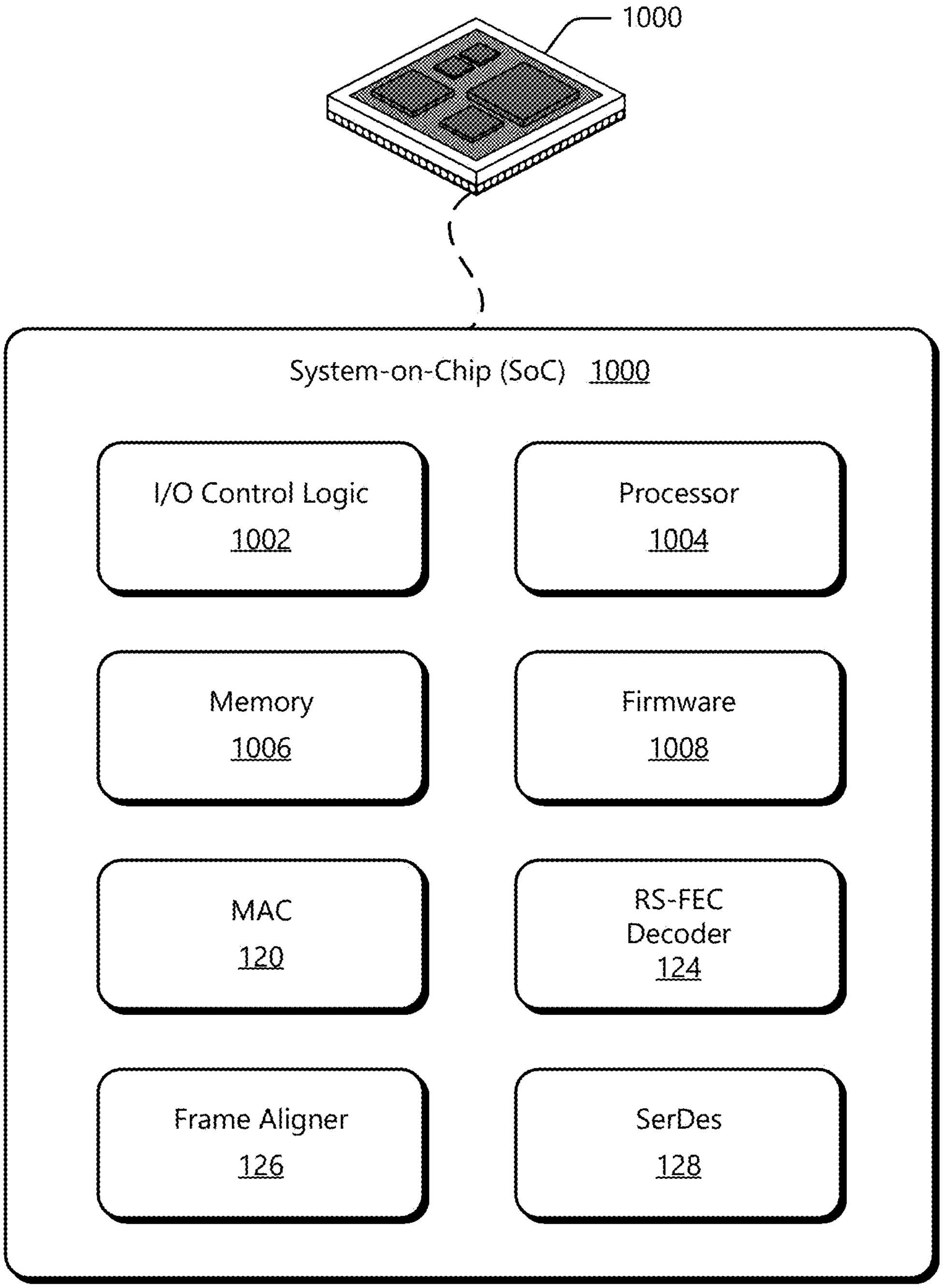
FIG. 10 illustrates an example System-on-Chip (SoC) environment in which aspects of adaptive frame alignment may be implemented.

FIG. 10 illustrates an example System-on-Chip (SoC) 1000 environment in which various aspects of adaptive frame alignment for receivers may be implemented. The SoC 1000 may be implemented in any suitable system or device, such as a network device, network switch, network endpoint, router, wireless access point, smart-phone, netbook, tablet computer, access point, network-attached storage, camera, smart appliance, printer, set-top box, server, data storage center, solid-state drive (SSD), hard disk drive (HDD), storage drive array, memory module, automotive computing system, aggregate storage controller, or any other suitable type of device (e.g., others described herein). Although described with reference to a SoC, the entities of FIG. 10 may also be implemented as other types of integrated circuits or embedded systems, such as an application-specific integrated-circuit (ASIC), memory controller, storage controller, communication controller, application-specific standard product (ASSP), digital signal processor (DSP), programmable SoC (PSoC), system-in-package (SiP), or field-programmable gate array (FPGA).

The SoC 1000 may be integrated with electronic circuitry, a microprocessor, memory, input-output (I/O) control logic, communication interfaces, firmware, and/or software useful to provide functionalities of a computing device, host system, or network system, such as any of the devices or components described herein (e.g., network switch or network endpoint). The SoC 1000 may also include an integrated data bus or interconnect fabric (not shown) that couples the various components of the SoC for control signaling, data communication, and/or routing between the components. The integrated data bus, interconnect fabric, or other components of the SoC 1000 may be exposed or accessed through an external port, a parallel data interface, a serial data interface, a fabric-based interface, a peripheral component interface, or any other suitable data interface. For example, the components of the SoC 1000 may access or control external storage media, processing blocks, network interfaces, neural networks, datasets, or AI models, through an external interface or off-chip data interface.

In this example, the SoC 1000 includes various components such as input-output (I/O) control logic 1002 and a hardware-based processor 1004 (processor 1004), such as a microprocessor, a processor core, an application processor, DSP, or the like. The SoC 1000 also includes memory 1006, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1004 and code stored on the memory 1006 are implemented as a network interface controller or network accelerator to provide various functionalities associated with adaptive frame alignment. In the context of this disclosure, the memory 1006 stores data, code, instructions, or other information via non-transitory signals, and does not include carrier waves or transitory signals. Alternatively or additionally, the SoC 1000 may comprise a data interface (not shown) for accessing additional or expandable off-chip storage media, such as solid-state memory (e.g., Flash or NAND memory), magnetic-based memory media, or optical-based memory media.

The SoC 1000 may also include firmware 1008, applications, programs, software, and/or an operating system, which may be embodied as processor-executable instructions maintained on the memory 1006 for execution by the processor 1004 to implement functionalities of the SoC 1000. The SoC 1000 may also include other communication interfaces, such as a transceiver interface for controlling or communicating with components of a local on-chip (not shown) or off-chip communication transceiver. Thus, in some aspects, the SoC 1000 may be implemented or configured as a communications transceiver that is capable of implementing aspects of adaptive frame alignment to process data received through a communication channel. Alternatively or additionally, the transceiver interface may also include or implement a signal interface to communicate radio frequency (RF), intermediate frequency (IF), or baseband frequency signals off-chip to facilitate wired or wireless communication through transceivers, PHYS, and MACs coupled to the SoC 1000. For example, the SoC 1000 may include a transceiver interface configured to enable storage over a wired or wireless network, such as to provide a network attached storage (NAS) volume with adaptive frame alignment for communicated data and/or stored data.

The SoC 1000 also includes a MAC layer 120, RS-FEC decoder 124, frame aligner 126, and a SerDes 128, which may be implemented separately as shown or combined with a host controller, data interface, data transceiver. In accordance with various aspects of adaptive frame alignment, the frame aligner 126 stores the symbols received via a PHY of the SoC 1000 in a buffer and forms a frame from first symbols stored in the buffer. The frame aligner sends the frame to the RS-FEC decoder 124 for decoding and may receive, from the RS-FEC decoder 124, an indication of a failure to decode the symbols of the data frame. The frame aligner 126 then alters, based on the failure to decode the frame, a pointer of the buffer to realign the symbols of a second frame formed from second symbols in the buffer and sends second frame of the realigned symbols to the RS-FEC decoder 124 for decoding to provide decoded data that corresponds to the subsequent frame of realigned symbols. Any of these entities may be embodied as disparate or combined components, as described with reference to various aspects presented herein. For example, the frame aligner 126 may be implemented as part of a frame synchronization block, symbol buffer, decoder, or PHY of a network controller or communication transceiver. Examples of these components and/or entities, or of corresponding functionality, are described with reference to the respective components or entities of the environment 100 of FIG. 1, network environment 200 of FIG. 2, or the respective configurations illustrated in FIG. 3 through FIG. 6, and/or the methods 700 through 900 of FIG. 7 through FIG. 9. The frame aligner 126 or components thereof, either in whole or in part, may be implemented as processor-executable instructions maintained by the memory 1006 and executed by the processor 1004 to implement various aspects and/or features of adaptive frame alignment.

The frame aligner 126 may be implemented independently or in combination with any suitable component or circuitry to implement aspects described herein. For example, the frame aligner 126 or RS-FEC decoder 124 may be implemented as part of a DSP, PHY, processor/storage bridge, I/O bridge, graphics processing unit, memory controller, storage controller, arithmetic logic unit (ALU), or the like. The frame aligner 126 may also be provided integrally with other entities of the SoC 1000, such as integrated with the processor 1004, the memory 1006, the firmware 1008, or communication interface of the SoC 1000. Alternatively or additionally, the frame aligner 126, buffer of the frame aligner, alignment block of the frame aligner, and/or other components of the SoC 1000 may be implemented as hardware, firmware, fixed logic circuitry, or any combination thereof.

Figure 11:
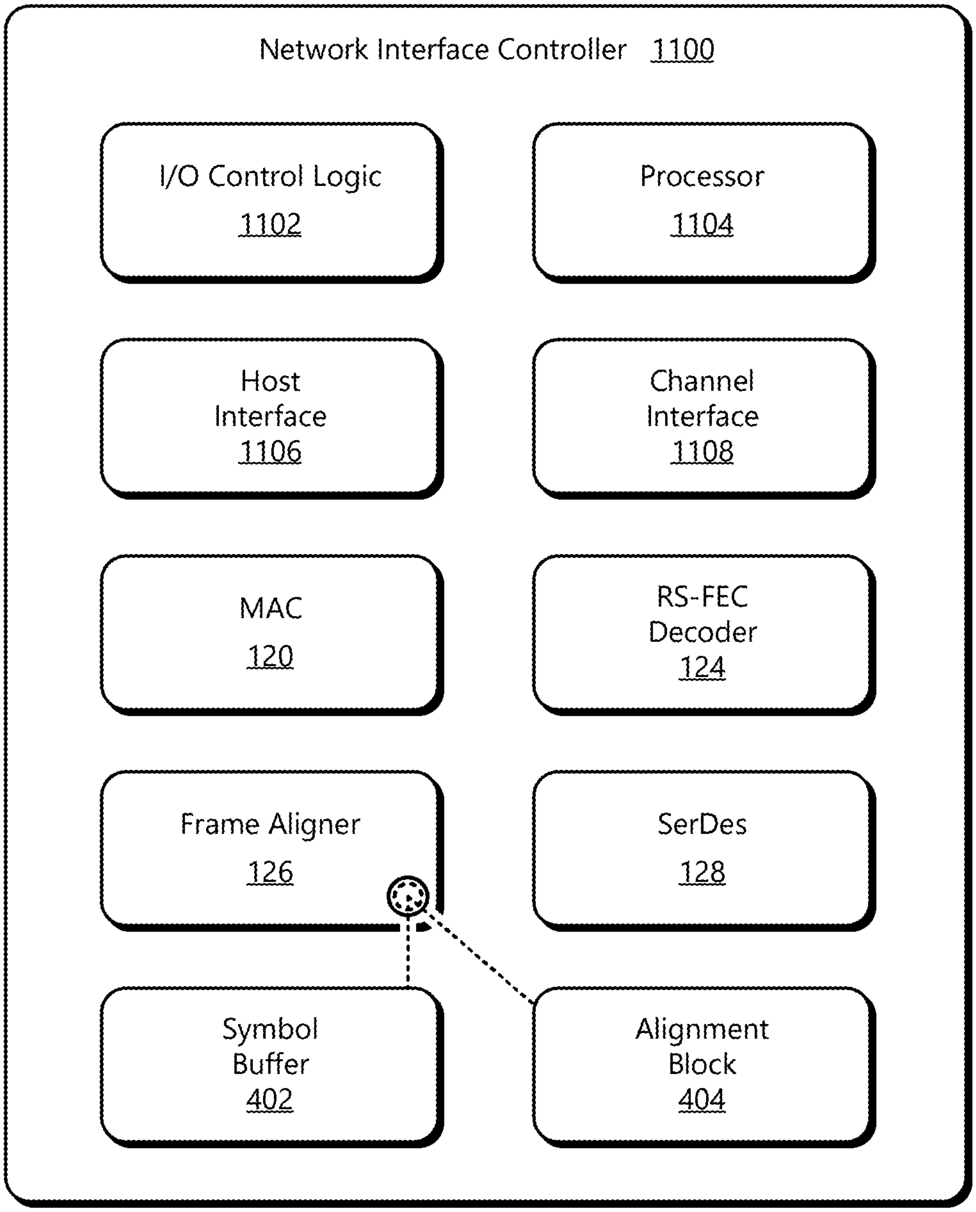
FIG. 11 illustrates an example network interface controller in which an adaptive frame aligner is implemented in accordance with one or more aspects.

As another example, consider FIG. 11 which illustrates an example network interface controller 1100 in accordance with one or more aspects of adaptive frame alignment. In various aspects, the network interface controller 1100 or any combination of components thereof may be implemented as a network switch controller, network endpoint controller, NAS controller, Fabric interface, NVMe target, or network accelerator. In some cases, the network interface controller 1100 is implemented similarly to or with components of the SoC 1000 as described with reference to FIG. 10. In other words, an instance of the SoC 1000 may be configured as a network interface controller, such as the network interface controller 1100 to enable data communication or data routing with aspects of adaptive frame alignment.

As shown in FIG. 11, the network interface controller 1100 includes input-output (I/O) control logic 1102 and a processor 1104, such as a microprocessor, a processor core, an application processor, a DSP, or the like. In some aspects, the processor 1104 and firmware of the network interface controller 1100 may be implemented to provide various functionalities associated with adaptive frame alignment, such as those described with reference to any of the methods 700 through 900. The network interface controller 1100 also includes a host interface 1106 and a channel interface 1108, which enable access to a host system and communication channel, respectively. The network interface controller 1100 may also include a MAC layer 120, an RS-FEC decoder 124, a frame aligner 126, a SerDes 128, a FIFO buffer 402, and/or an alignment block 404. In some aspects of adaptive frame alignment, the frame aligner 126 interacts with FIFO buffer 402, alignment block 404, and/or the RS-FEC decoder 124 to implement adaptive frame alignment to decode data received from the channel interface 1108 that includes one or more misaligned frames.

Any or all of these components may be implemented separately as shown or combined with the processor 1104, the host interface 1106, the channel interface 1108, RS-FEC decoder 124, and/or as an adaptive frame alignment-enabled PHY of the network interface controller 1100. Examples of these components and/or entities, or of corresponding functionality, are described with reference to the respective components or entities of the environment 100 of FIG. 1, network environment 200 of FIG. 3, or the respective configurations illustrated in FIG. 2 through FIG. 6. In accordance with various aspects of adaptive frame alignment, the frame aligner 126 stores the symbols received via the channel interface 1108 (e.g., a PHY) to the FIFO buffer 402 and forms a frame from first symbols stored in the FIFO buffer. The frame aligner sends the frame to the RS-FEC decoder 124 for decoding and may receive, from the RS-FEC decoder 124, an indication of a failure to decode the first symbols of the frame. The frame aligner 126 may then employ the alignment block 404 to adjust a pointer of the FIFO buffer 402 to realign symbols of a subsequent frame formed from second symbols of the buffer and send the subsequent frame of realigned symbols to the RS-FEC decoder 124 for decoding to provide decoded data that corresponds to the subsequent frame of the realigned symbols. By realigning the symbols of the frame, the adaptive frame aligner may enable the decoder to continue decoding subsequent frames without retraining a data link, avoiding data loss or data link interruptions.

Although the subject matter of adaptive frame alignment has been described in language specific to structural features and/or methodological operations, it is to be understood that the subject matter recited by the appended claims is not necessarily limited to the specific examples, features, configurations, or operations described herein, including orders in which they are performed.

What is claimed is:

1. A method for adaptive frame alignment implemented by a receiver, comprising:

storing symbols received via a physical layer (PHY) in a first-in, first-out (FIFO) buffer of the receiver;

forming, based on a pointer of the FIFO buffer, a first frame of symbols from first symbols stored in the FIFO buffer, a position of the pointer indicating a respective starting symbol for frames formed from the symbols stored in the FIFO buffer;

providing, from the FIFO buffer, the first frame of symbols to a decoder of the receiver for decoding;

detecting a failure to decode the first frame of symbols;

moving, in response to the failure to decode the first frame of symbols, the position of the pointer of the FIFO buffer forward one symbol or backward one symbol to realign symbols of a second frame of symbols formed from second symbols stored in the FIFO buffer, the second symbols from which the second frame is formed being different from the first symbols from which the first frame is formed;

decoding the realigned symbols of the second frame of symbols; and providing data decoded from the realigned symbols of the second frame of symbols.

2. The method as recited in claim 1, further comprising:

in response to detecting the failure to decode the symbols of the first frame, determining a signal quality metric for the first frame, and wherein:

the moving of the pointer of the FIFO buffer is performed in response to the signal quality metric of the first frame meeting a signal quality threshold.

3. The method as recited in claim 1, wherein the pointer of the FIFO buffer comprises a read pointer of the FIFO buffer.

4. The method as recited in claim 1, further comprising:

forming, prior to forming the first frame of symbols and based on an initial position of the pointer of the FIFO buffer, an initial frame of symbols from initial symbols stored in the FIFO buffer;

providing, from the FIFO buffer, the initial frame of symbols to the decoder of the receiver for decoding;

detecting a failure to decode symbols of the initial frame of symbols; and moving, in response to the failure to decode the initial frame of symbols, the initial position of the pointer of the FIFO buffer forward one symbol or backward one symbol to the position of the pointer to realign the symbols from which the first frame of symbols is formed.

5. The method as recited in claim 4, wherein:

moving the initial position of the pointer of the FIFO buffer to realign the symbols of the first frame moves the pointer of the FIFO buffer forward one symbol; and moving the position of the pointer of the FIFO buffer to realign the symbols of the second frame moves the pointer of the FIFO buffer backward two symbols.

6. The method as recited in claim 4, wherein:

moving the initial position of the pointer of the FIFO buffer to realign the symbols of the first frame moves the pointer of the buffer backward one symbol; and moving the position of the pointer of the FIFO buffer to realign the symbols of the second frame moves the pointer of the FIFO buffer forward two symbols.

7. The method as recited in claim 1, wherein the decoder of the receiver is configured to implement one of:

a Reed-Solomon code;

a Bose-Chaudhuri-Hocquenghem (BCH) code;

a Hamming code; or a Fire code.

8. The method as recited in claim 1, wherein the FIFO buffer is implemented as a ring buffer or a circular buffer.

9. The method of claim 1, wherein:

the symbols comprise pulse-amplitude modulation (PAM) symbols; and the PHY layer comprises a physical medium attachment layer of a wired interface.

10. The method as recited in claim 1, wherein decoding the realigned symbols of the second frame is effective to prevent a link drop between a transmitter of the symbols and the receiver at which the symbols are received.

11. A network device comprising:

a network port;

a physical layer (PHY) coupled to the network port;

a decoder;

a first-in, first-out (FIFO) buffer configured to store symbols received via the PHY; and an adaptive frame aligner configured to:

store the symbols received via the PHY to the FIFO buffer;

form, based on a pointer of the FIFO buffer, a first frame from first symbols stored in the FIFO buffer, a position of the pointer indicating a respective starting symbol for frames formed from the symbols stored in the FIFO buffer;

send the first frame of symbols to the decoder for decoding;

receive, from the decoder, an indication of a failure to decode the first frame of symbols;

move, in response to the failure to decode the first frame of symbols, the position of the pointer of the FIFO forward one symbol or backward one symbol to realign symbols of a subsequent second frame of symbols formed from second symbols stored in the FIFO buffer, the second symbols from which the second frame is formed being different from the first symbols from which the first frame is formed; and send the second frame of symbols to the decoder for decoding to provide decoded data that corresponds to the second frame of symbols.

12. The network device as recited in claim 11, wherein the adaptive frame aligner is further configured to:

in response to receiving the indication of the failure to decode the symbols of the first frame, determine a signal quality metric for the first frame; and move the pointer of the FIFO buffer in response to the signal quality metric of the first frame meeting a signal quality threshold.

13. The network device as recited in claim 11, wherein the pointer of the FIFO buffer comprises a read pointer of the FIFO buffer.

14. The network device as recited in claim 11, wherein the adaptive frame aligner is further configured to:

form, prior to forming the first frame of symbols and based on an initial position of the pointer of the FIFO buffer, an initial frame of symbols from initial symbols stored in the FIFO buffer;

send the initial frame of symbols to the decoder for decoding;

receive, from the decoder, an indication of a failure to decode the initial frame of symbols; and move, in response to the failure to decode the initial frame of symbols, the initial position of the pointer of the FIFO buffer forward one symbol or backward one symbol to position the pointer to realign the symbols from which the first frame of symbols is formed.

15. The network device as recited in claim 14, wherein:

to realign the symbols of the first frame, the adaptive frame aligner moves the position of the pointer forward one symbol, and to realign the symbols of the second frame, the adaptive frame aligner moves the position of the pointer backward two symbols; or to realign the symbols of the first frame, the adaptive frame aligner moves the position of the pointer backward one symbol, and to realign the symbols of the second frame, the adaptive frame aligner moves the position of the pointer forward two symbols.

16. The network device as recited in claim 11, wherein:

the decoder is configured to implement a Reed-Solomon code, a Bose-Chaudhuri-Hocquenghem (BCH) code, a Hamming code, or a Fire code; or the FIFO buffer is implemented as a a ring buffer or a circular buffer.

17. A system-on-chip (SoC) comprising:

circuitry configured to implement a wired communication interface;

a physical layer (PHY) coupled to the circuitry;

a decoder;

a first-in, first-out (FIFO) buffer configured to store symbols received via the PHY; and an adaptive frame aligner configured to:

store the symbols received via the PHY to the FIFO buffer;

form, based on a pointer of the FIFO buffer, a first frame of symbols from first symbols stored in the FIFO buffer, a position of the pointer indicating a respective starting symbol for frames formed from the symbols stored in the FIFO buffer;

send the first frame of symbols to the decoder for decoding;

receive, from the decoder, an indication of a failure to decode the first frame of symbols;

alter, in response to the failure to decode the first frame of symbols, the position of the pointer of the FIFO buffer forward one symbol or backward one symbol to realign symbols of a second frame of symbols formed from second symbols stored in the FIFO buffer, the second symbols from which the second frame is formed being different from the first symbols from which the first frame is formed; and send the second frame of symbols to the decoder for decoding to provide decoded data that corresponds to the second frame of symbols.

18. The SoC as recited in claim 17, wherein the adaptive frame aligner is further configured to:

in response to receiving the indication of the failure to decode the first symbols of the first frame, determine a signal quality metric for the first frame; and alter the pointer of the FIFO buffer in response to the signal quality metric of the first frame meeting a signal quality threshold.

19. The SoC as recited in claim 17, wherein the pointer of the FIFO buffer comprises a read pointer of the FIFO buffer.

20. The SoC as recited in claim 17, wherein:

the decoder is configured to implement a Reed-Solomon code, a Bose-Chaudhuri-Hocquenghem (BCH) code, a Hamming code, or a Fire code; or the FIFO buffer is implemented as a a ring buffer or a circular buffer.

* * * * *